US007069554B1

(12) United States Patent
Stammers et al.

(10) Patent No.: US 7,069,554 B1
(45) Date of Patent: Jun. 27, 2006

(54) COMPONENT INSTALLER PERMITTING INTERACTION AMONG ISOLATED COMPONENTS IN ACCORDANCE WITH DEFINED RULES

(75) Inventors: Soren Stammers, Kentfield, CA (US); Jamie A. Band, London (GB); Andrew P. Sadler, London (GB); Andrew J. Patterson, London (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/478,624

(22) Filed: Jan. 5, 2000

Related U.S. Application Data

(63) Continuation of application No. PCT/GB99/01390, filed on May 5, 1999.

(30) Foreign Application Priority Data

Jun. 5, 1998 (GB) ............................... 9809670.4
Jun. 7, 1998 (GB) ............................... 9814615.2

(51) Int. Cl.
*G06F 9/445* (2006.01)
(52) U.S. Cl. ..................... 717/178; 717/176; 709/220
(58) Field of Classification Search ........ 717/168–178; 709/201–233
See application file for complete search history.

(56) References Cited

U.S. PATENT DOCUMENTS

| 5,664,195 | A * | 9/1997 | Chatterji ...................... 717/178 |
| 6,202,207 | B1 * | 3/2001 | Donohue ..................... 717/173 |
| 6,216,152 | B1 * | 4/2001 | Wong et al. ................. 709/203 |
| 6,259,448 | B1 * | 7/2001 | McNally et al. ............. 345/733 |
| 6,279,030 | B1 * | 8/2001 | Britton et al. .............. 709/203 |
| 6,347,398 | B1 * | 2/2002 | Parthasarathy et al. ..... 717/178 |
| 6,370,686 | B1 * | 4/2002 | Delo et al. ................... 717/174 |

FOREIGN PATENT DOCUMENTS

EP  0 570 123 A1  11/1993
EP  0 845 733 A2  6/1998

OTHER PUBLICATIONS

"Information about a Conventional JAR file", http://javalsun.com/products/jdk/1.1/docs/guide/jar/jar-Guide.html., Sun Microsystems, 2 pages, (1996).

(Continued)

*Primary Examiner*—Tuan Dam
*Assistant Examiner*—Chuck Kendall
(74) *Attorney, Agent, or Firm*—Meyertons Hood Kivlin Kowert & Goetzel, P.C.; B. Noël Kim

(57) ABSTRACT

A programmable computer processing apparatus is connected to a number of servers. Each server stores one or more separate components which, when combined, make up a processing application. Each component specifies any other components which it requires. Computer is arranged to identify a first component needed by an application requested by a user, to fetch the first component from the server storing the component, to fetch any additional components needed by the first component, and to continue fetching components until all of the components required for the application have been fetched. Computer is arranged to install the components in a Java virtual machine using a different classloader for each component and to perform control to permit inter-component interaction and interaction between the components and the resources of computer only in accordance with predefined rules. This prevents unauthorized access by a component to the functionality of another component or computer. Components may be downloaded from servers to take account of upgrades in the components.

36 Claims, 27 Drawing Sheets

OTHER PUBLICATIONS

"The JAR Format—Netscape Communications Corporation 1997", http://developer.netscape.com/library/documentation/signedobj/jarfile/index.html, 11 pages, (1997).

"The Java Virtual Machine Specification", http://www.javasoft.com/docs/books/vmspec/index.html., The Source for Java Technology, 4 pages, (1999).

Arnold, K., et al., "The Java Programming Language", *Addison-Wesley*, ISBN 0201310066, 2 pgs., (1996).

Bank, J.A., "Java Security", *Retrieved from Internet on Feb. 4, 1999*: www.swiss.ai.mit.edu/{jbank/javapaper/javapaper.html., XP002092325, pp. 1-13, (Dec. 8, 1995).

Dean, D., et al., "Java Security: From HotJava to Netscape and Beyond", *Proceedings of the 1996 IEEE Symposium on Security and Privacy, Oakland CA.*, No. Symp. 17, XP000634844, pp. 190-200, (May 6-8, 1996).

Gosling, J., et al., "The Java Language Enviornment. A White Paper", *Sun Delivers Java Workshop*, XP002042922, pp. 1, 4-85, (Oct. 1995).

Gosling, J., et al., "The JavaTM—Language Specification", XP002042923, pp. 215-236, (Aug. 1996).

McGraw, G., et al., "Java Security: Hostile Applets, Holes and Antidotes", *J. Wiley & Sons*, ISBN 0-471-17842-X, 2 pgs, (1997).

\* cited by examiner

| COMPONENT | VERSION | LOCATION | LOCAL COPY | DATE STORED |
|---|---|---|---|---|
| A | 1.0 | ADDRESS A1<br>ADDRESS A2 | ✓ | |
| B | 1.0 | ADDRESS B | ✓ | |
| C | 1.0 | ADDRESS C | ✓ | |

FIG. 17

COMPONENT INSTALLER PERMITTING INTERACTION AMONG ISOLATED COMPONENTS IN ACCORDANCE WITH DEFINED RULES

CROSS-REFERENCE TO RELATED APPLICATIONS

This application is a continuation of International Patent Application No. PCT/GB99/01390, filed on 5 May 1999, which in turn is an international filing of British Patent Application No. 9809670.4, filed on 6 May 1998, and of British Patent Application No. 9814615.2, filed on 6 July 1998, all of which are incorporated herein by reference.

The present invention relates to programmable processing apparatus and to the way in which an apparatus is configured to enable processing operations to be performed.

Up to now, applications to be run on a programmable computer processing apparatus (such as word processing applications, image processing applications, finance applications, etc.) have been created and sold as a complete, functioning software package. Such a package typically comprises operating instructions, divided into libraries containing instructions for different functions. An integrated, monolithic package is sold to a user for loading into a computer processing apparatus.

The overall application may be supplied to the user on a storage medium, such as a disk, or may be transmitted to the user, for example over a network such as the Internet.

The approach described above, however, suffers from a number of problems.

For example, because it is necessary to determine what functions are required within an application and how the functions should interact, a skilled person is required to create the application.

In addition, improvements in a particular function within an application can only be conveyed to the user by re-sending the whole application. Also, a user must be made aware of the improvements by the developer, evaluate them, and request that the new, improved application be sent if desired. This can be time consuming and expensive.

Further, it may be desirable (or essential) that:
 a particular application should be used by only certain users or developers; and/or
 only certain functions within a particular application should be made available to a particular user or developer; and/or
 a particular application should be used only in a certain way by a user or developer; and/or
 a new application loaded into an apparatus should not be allowed to interact with existing applications, data, or resources, or should be allowed to do so only in certain ways to provide security.

Yet further, if signals defining the application are transmitted to a user or developer, for example over a network, security may be compromised since the signals may be intercepted and changed by a third party. A user or developer may also change the instructions himself in order to gain access to previously unavailable functionality.

The present invention aims to address one or more of the above problems.

According to a first aspect of the invention, there is provided an apparatus or method in which separate functional components to make up a processing application are provided to a user from different locations. Each functional component specifies the other functional components it requires in order to perform the required processing. The user's computer processing apparatus may be provided with a processing capability for gathering the components from external sources connected to the user's apparatus. In this case, upgrades of a component may be downloaded from the network.

To provide security, the present invention also comprises an apparatus or method in which functional components for a processing application are provided such that the components are isolated from each other and the processing functionality of the apparatus, and interaction between components and the processing units is controlled in accordance with predefined rules.

The present invention also provides an apparatus or method in which functional components are arranged and tested to verify their authenticity and/or to verify the interaction which is allowed with other components.

The present invention provides a processing apparatus comprising means for fetching and/or integrating individual components to form an application.

The invention also provides an apparatus comprising means for controlling communication between stored components of an application and/or between a stored component and processing functions of the apparatus in order to prevent unauthorised interaction.

The invention also provides a processing apparatus comprising means for preventing interaction between stored components of an application and/or between the components and facilities of the apparatus otherwise than in accordance with predefined rules.

The present invention further comprises processing apparatus provided with means for verifying the authenticity of components defining an application and/or the authenticity of data defining the interaction between the components.

The present invention also provides an apparatus storing a functional component arranged to be used in one or more of the systems above.

An embodiment of the invention allows component developers to retain control of access to functionality within a component.

An embodiment of the invention allows existing components to be re-used, significantly reducing the time to market for applications.

Embodiments of the invention will now be described by way of example only with reference to the accompanying drawings, in which.

Figure 4:
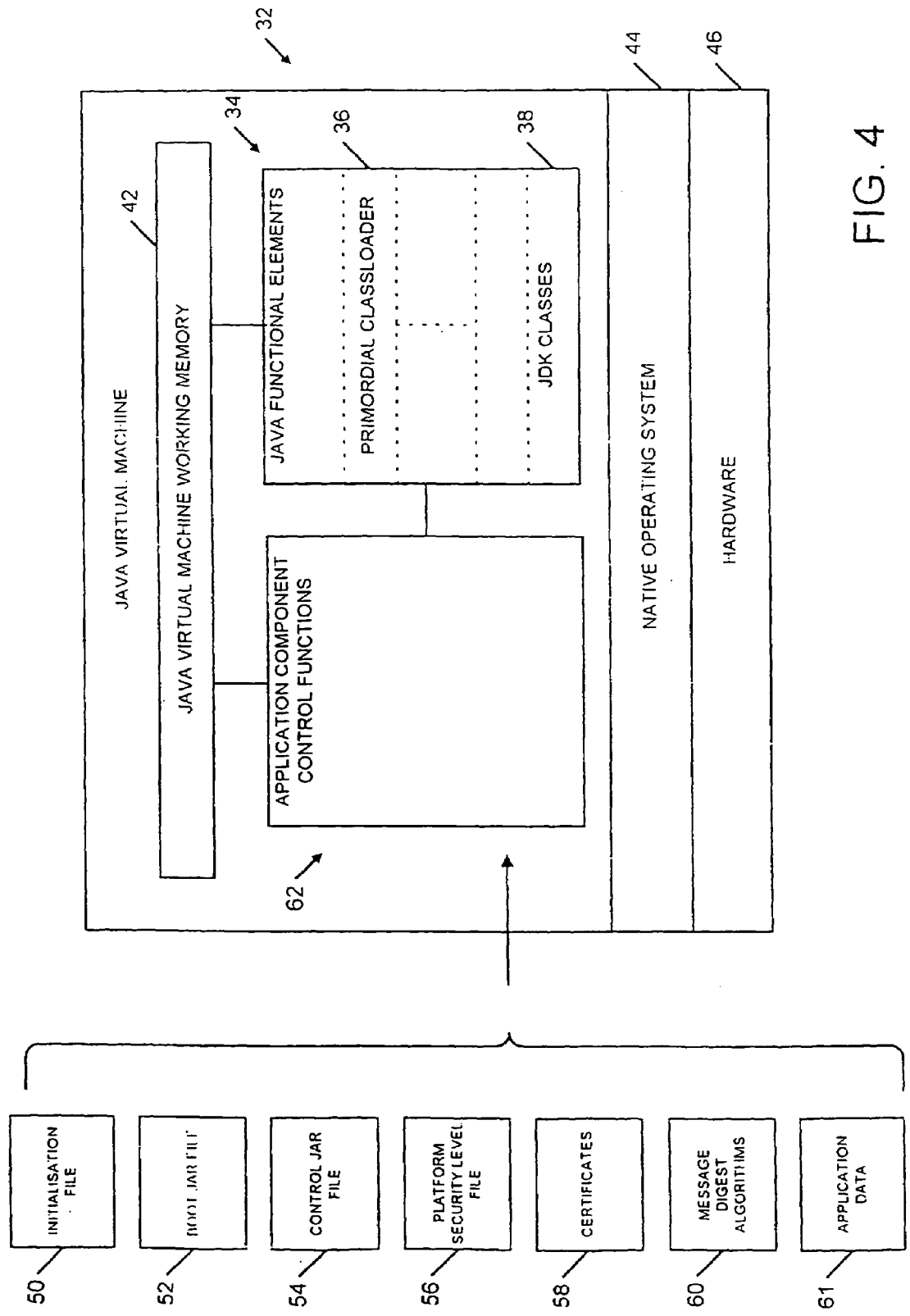
Figure 5:
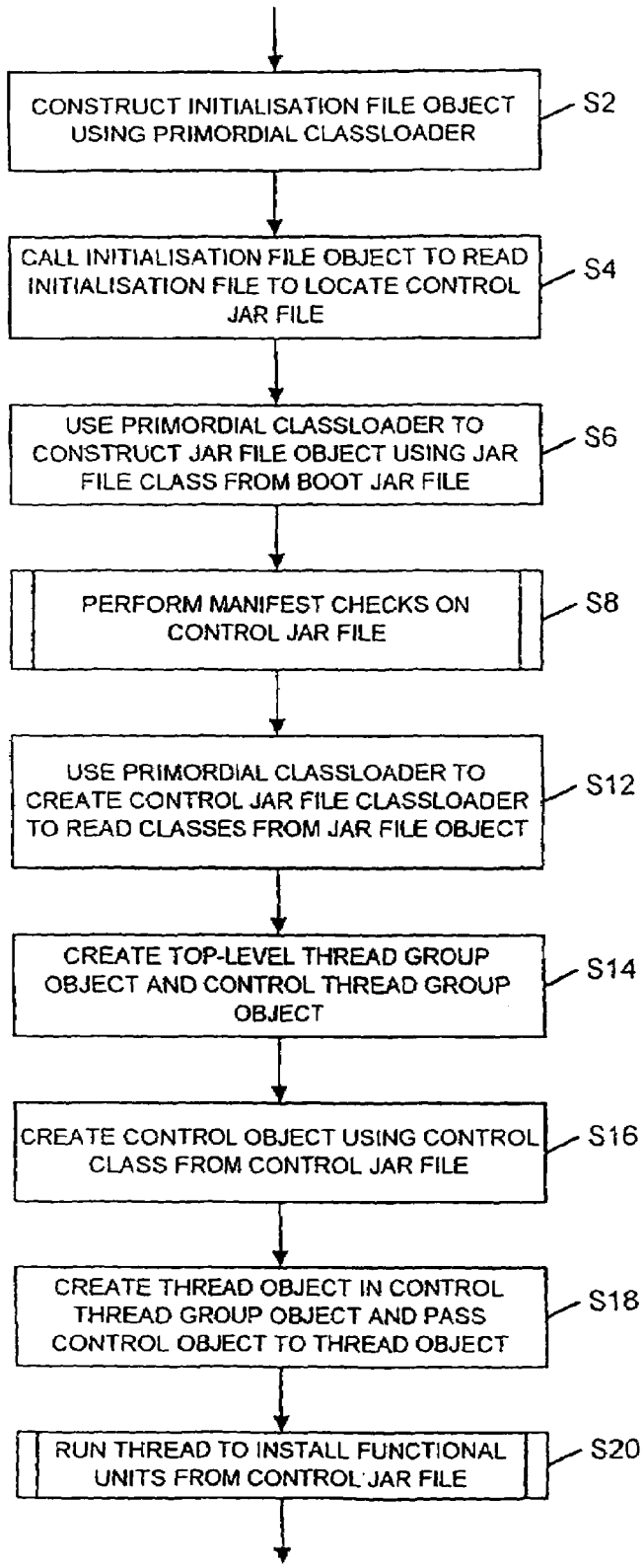
Figure 6:
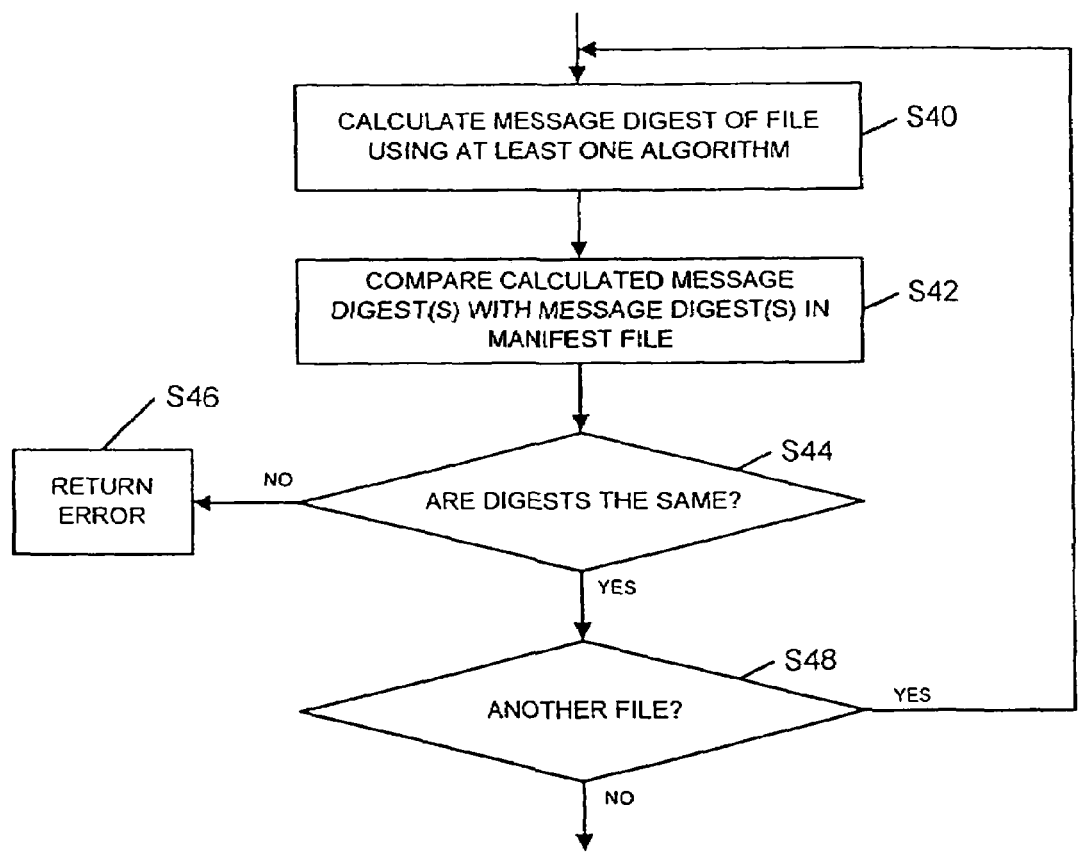
Figure 7:
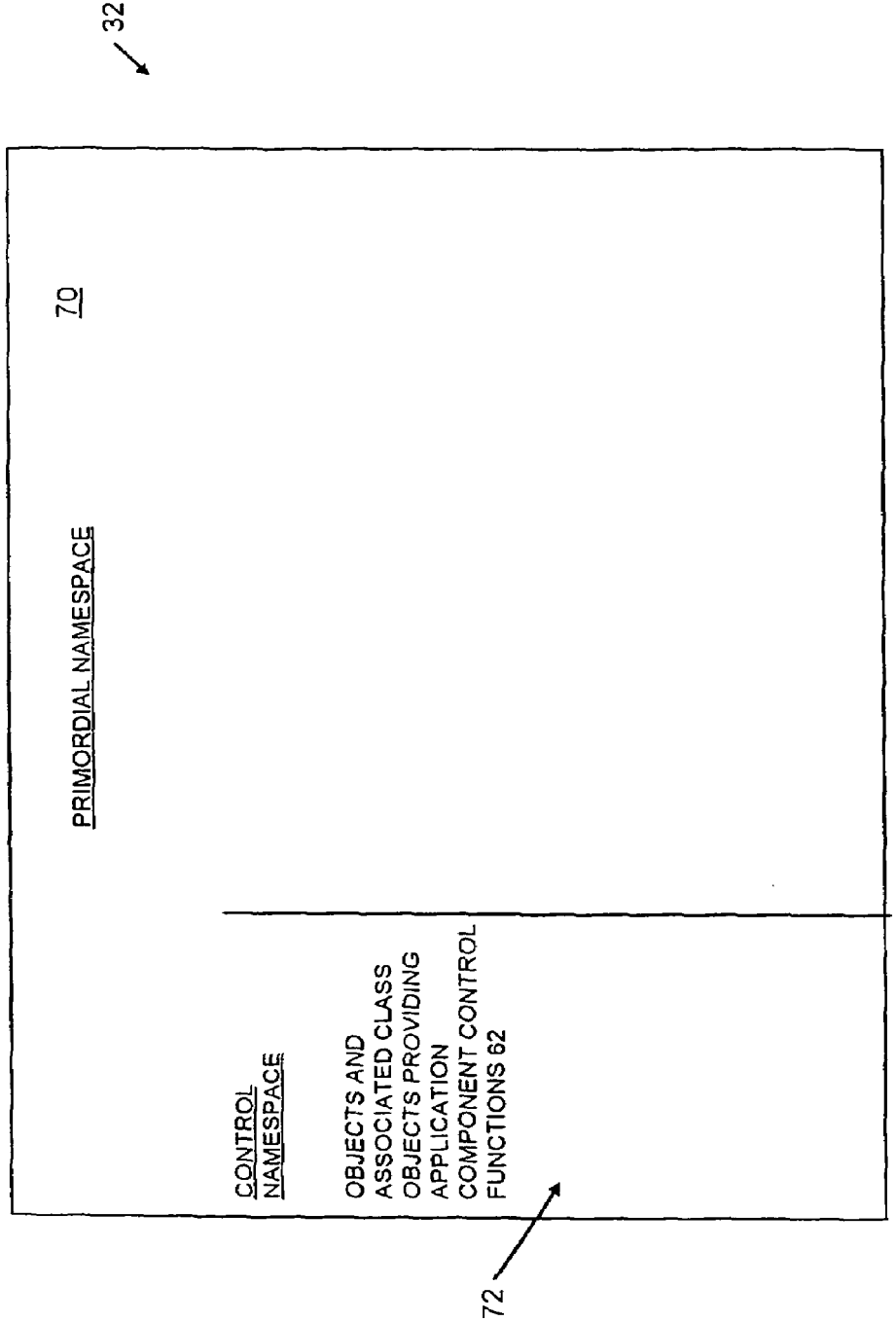
Figure 8:
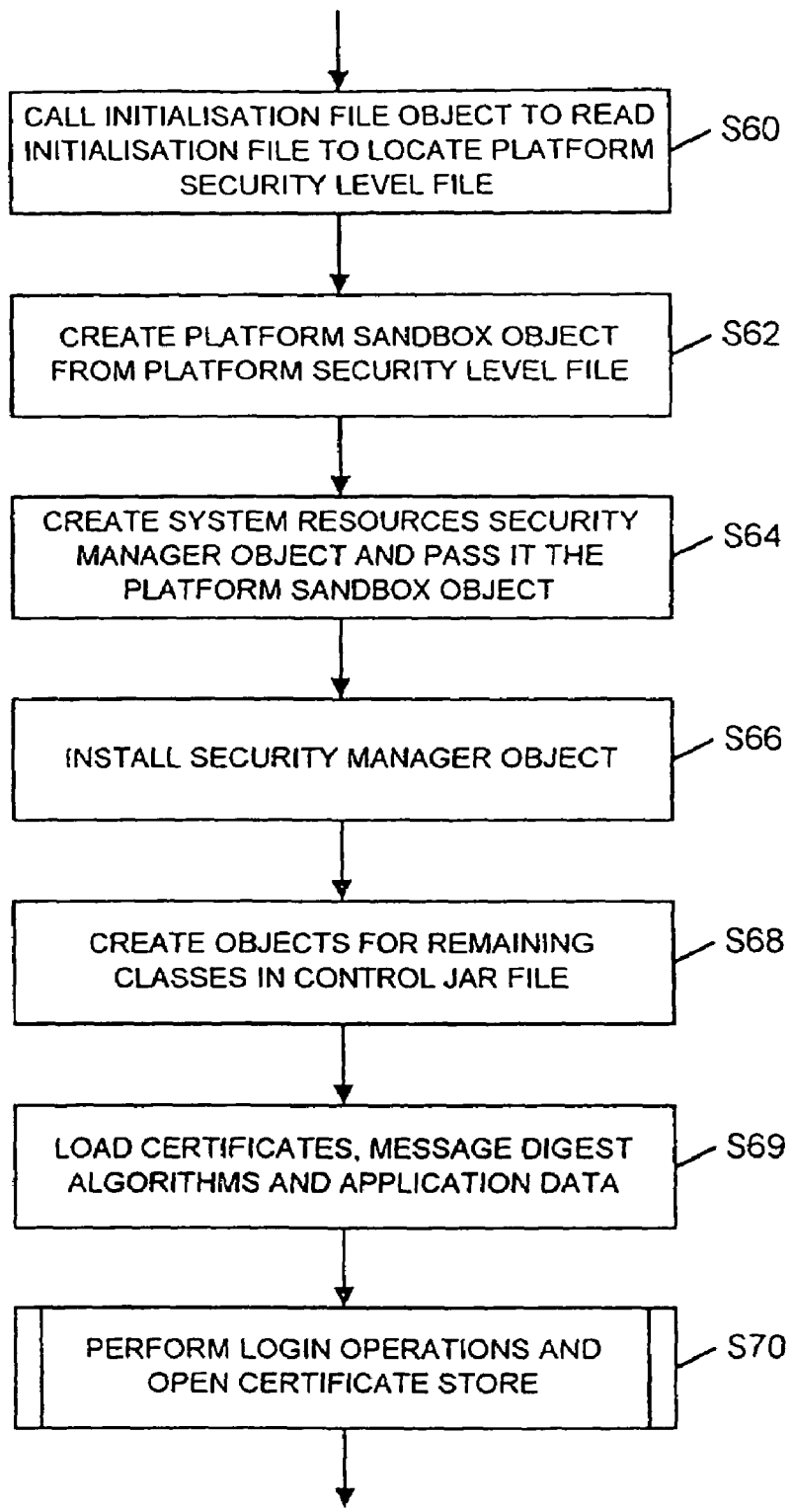
Figure 9:
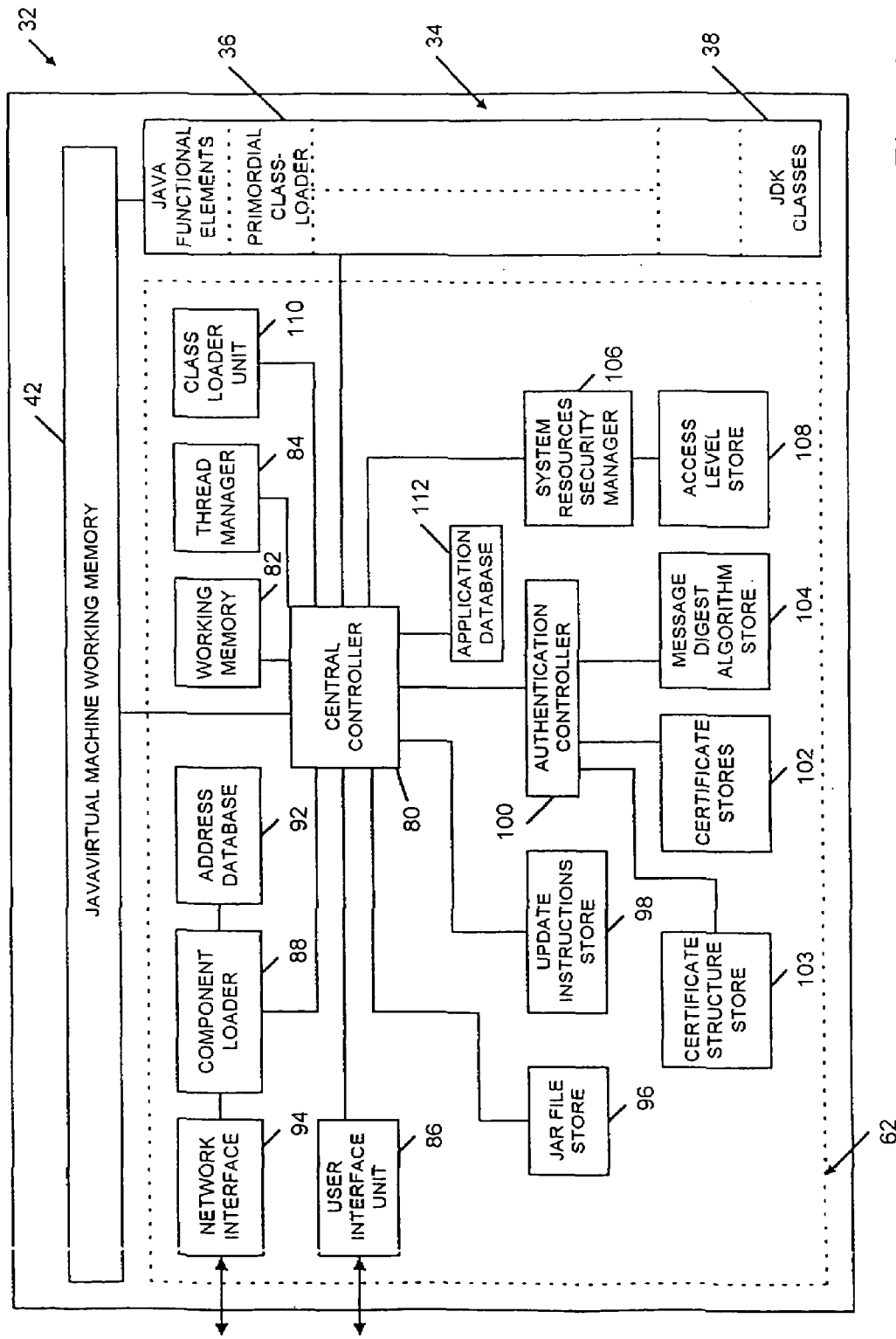
Figure 10:
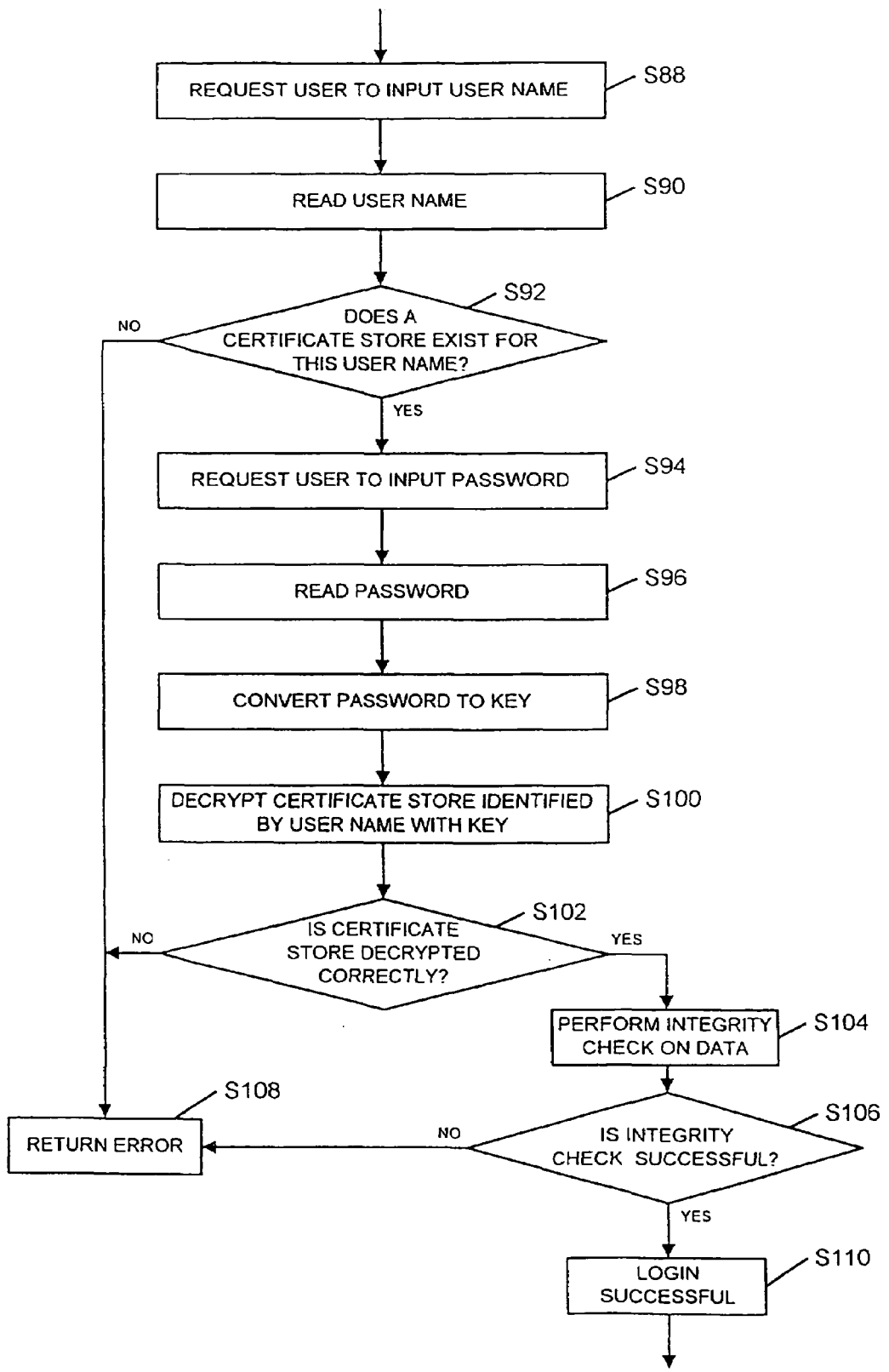
Figure 11A:
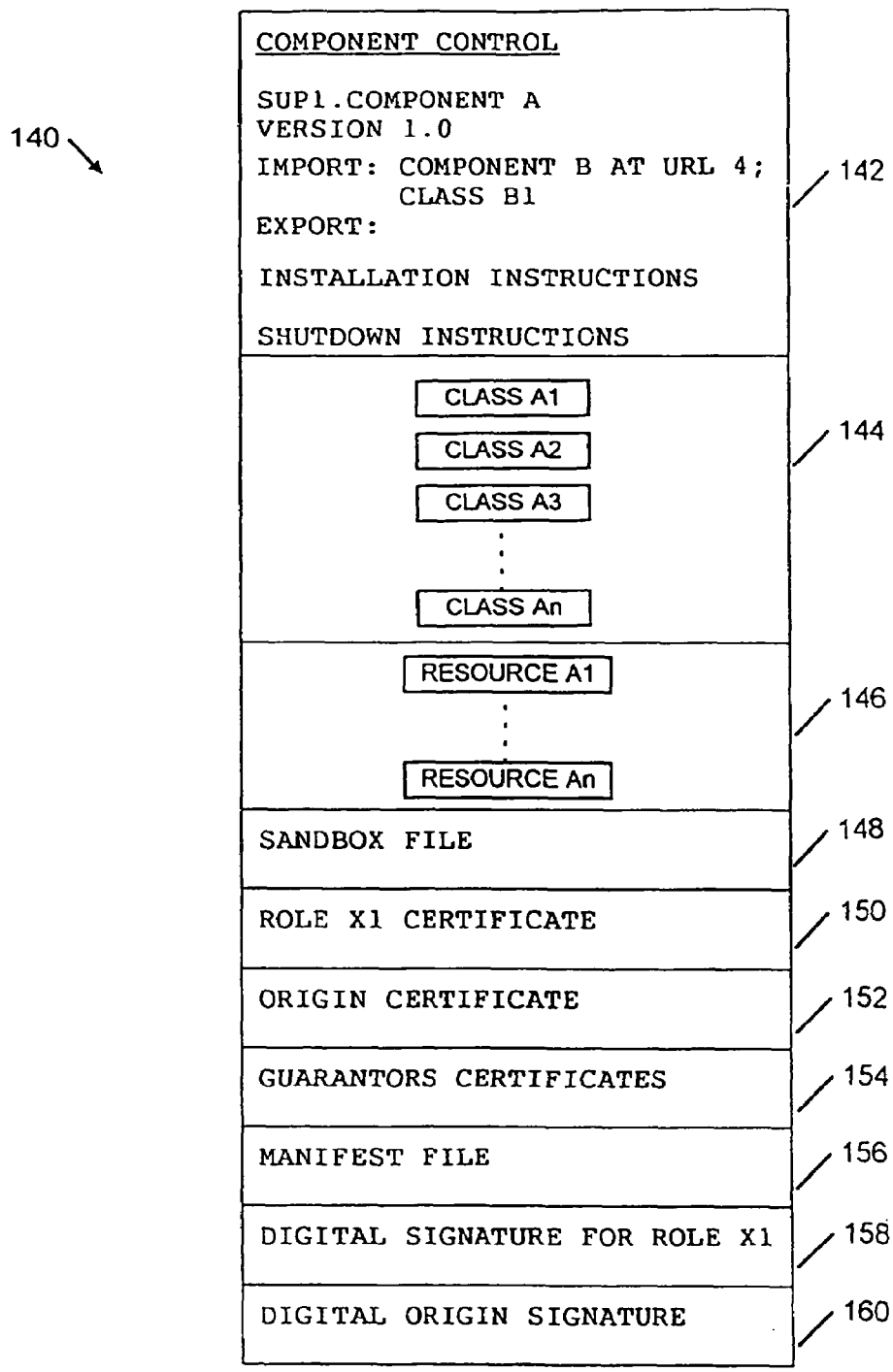
Figure 11B:
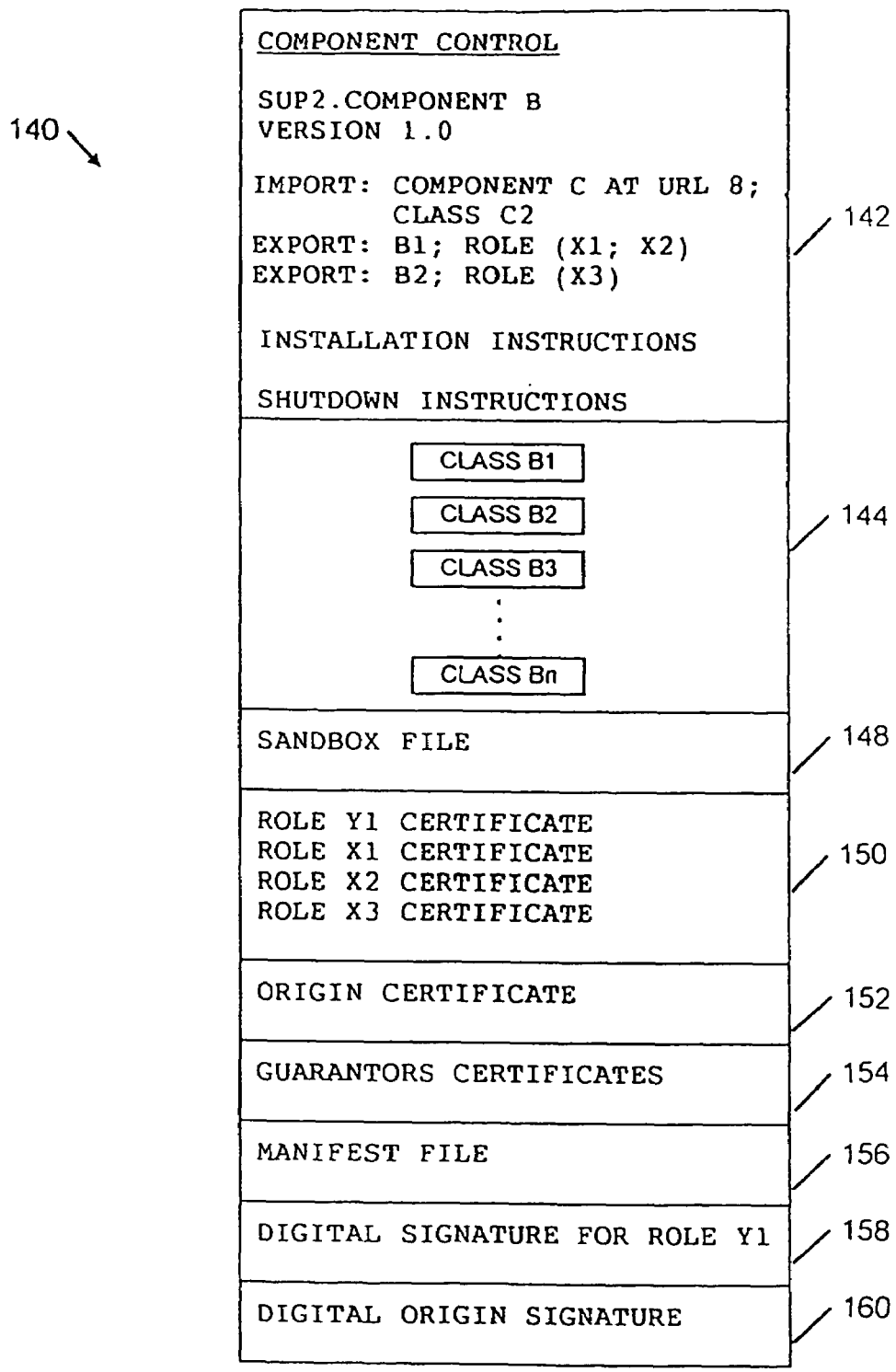
Figure 11C:
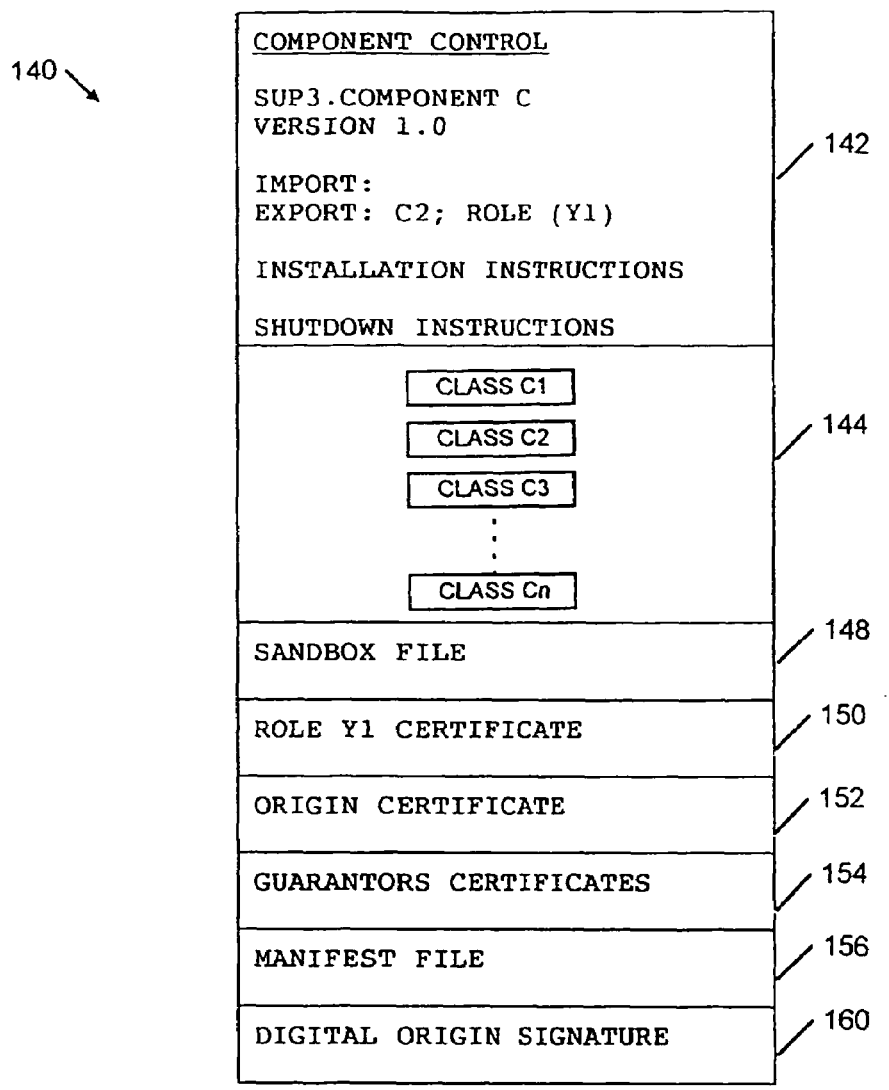
Figure 12:
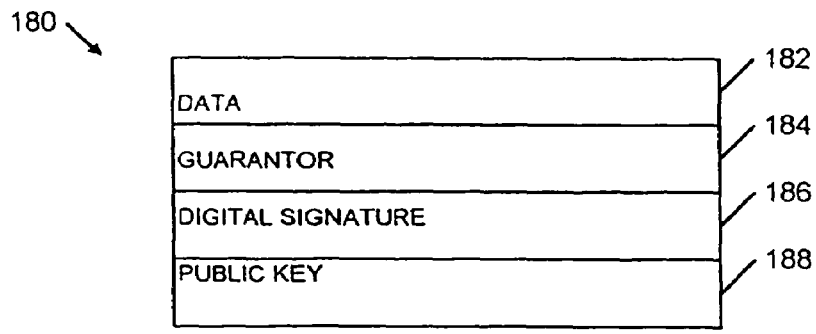
Figure 13:
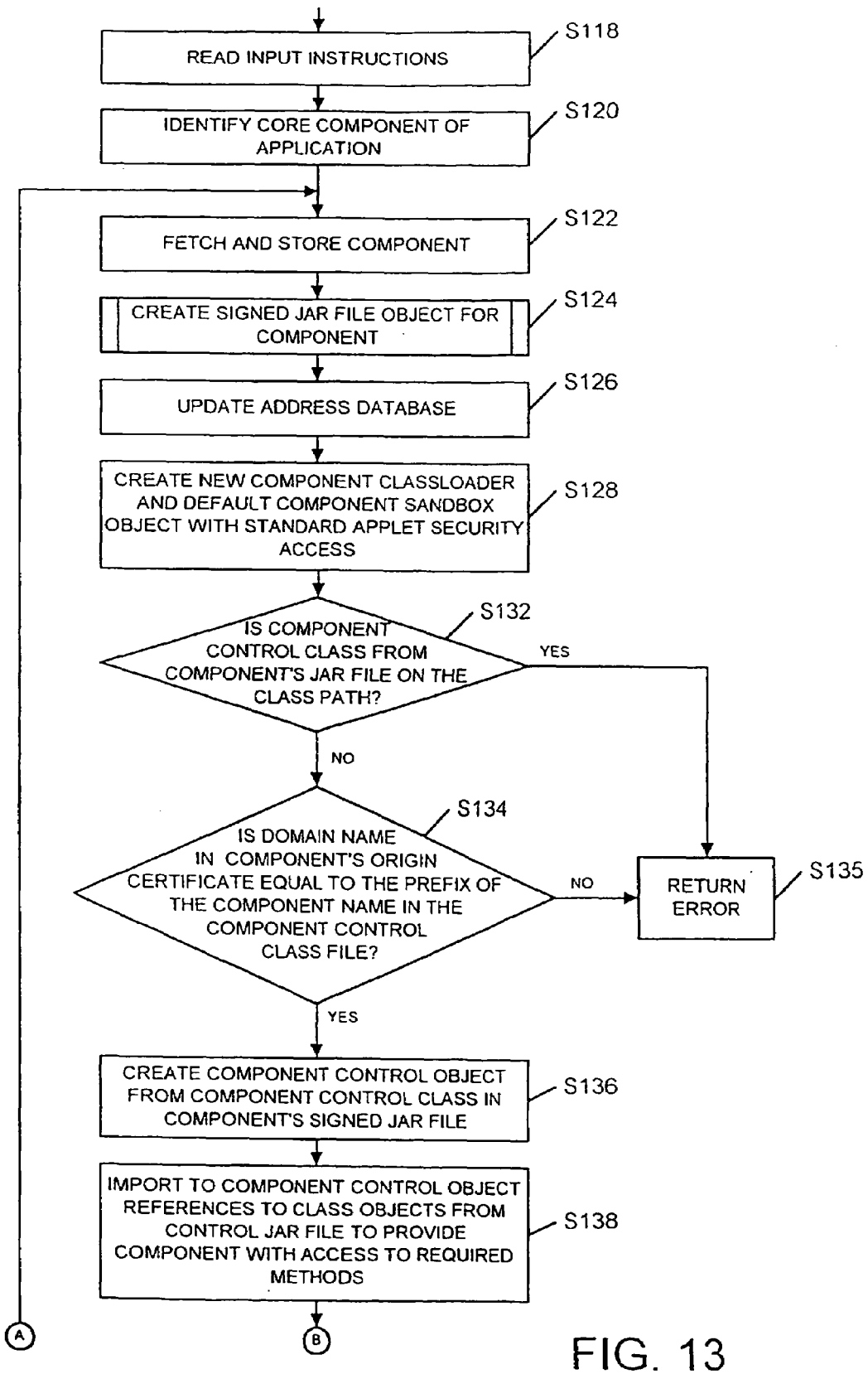
Figure 13:
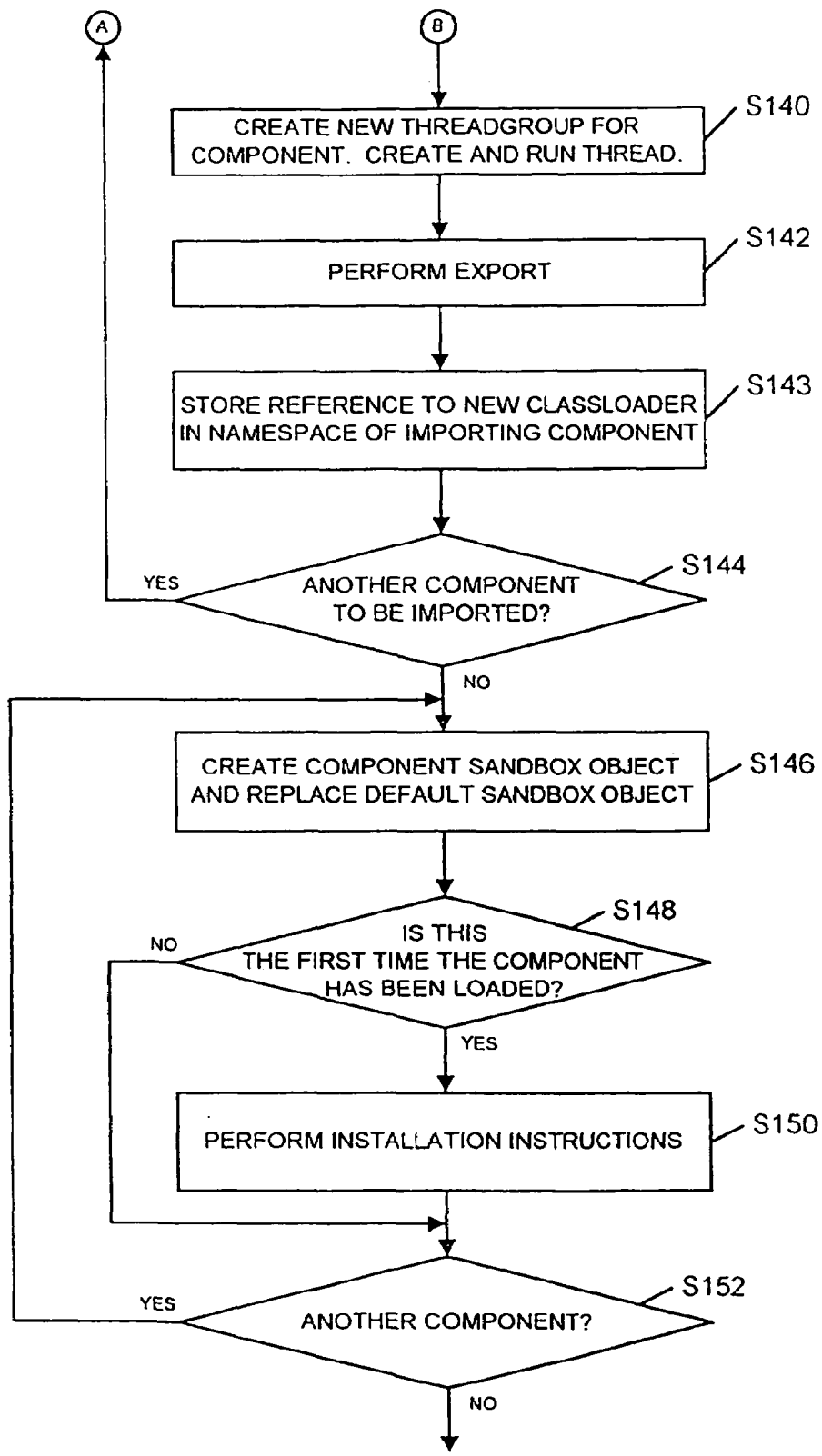
Figure 14:
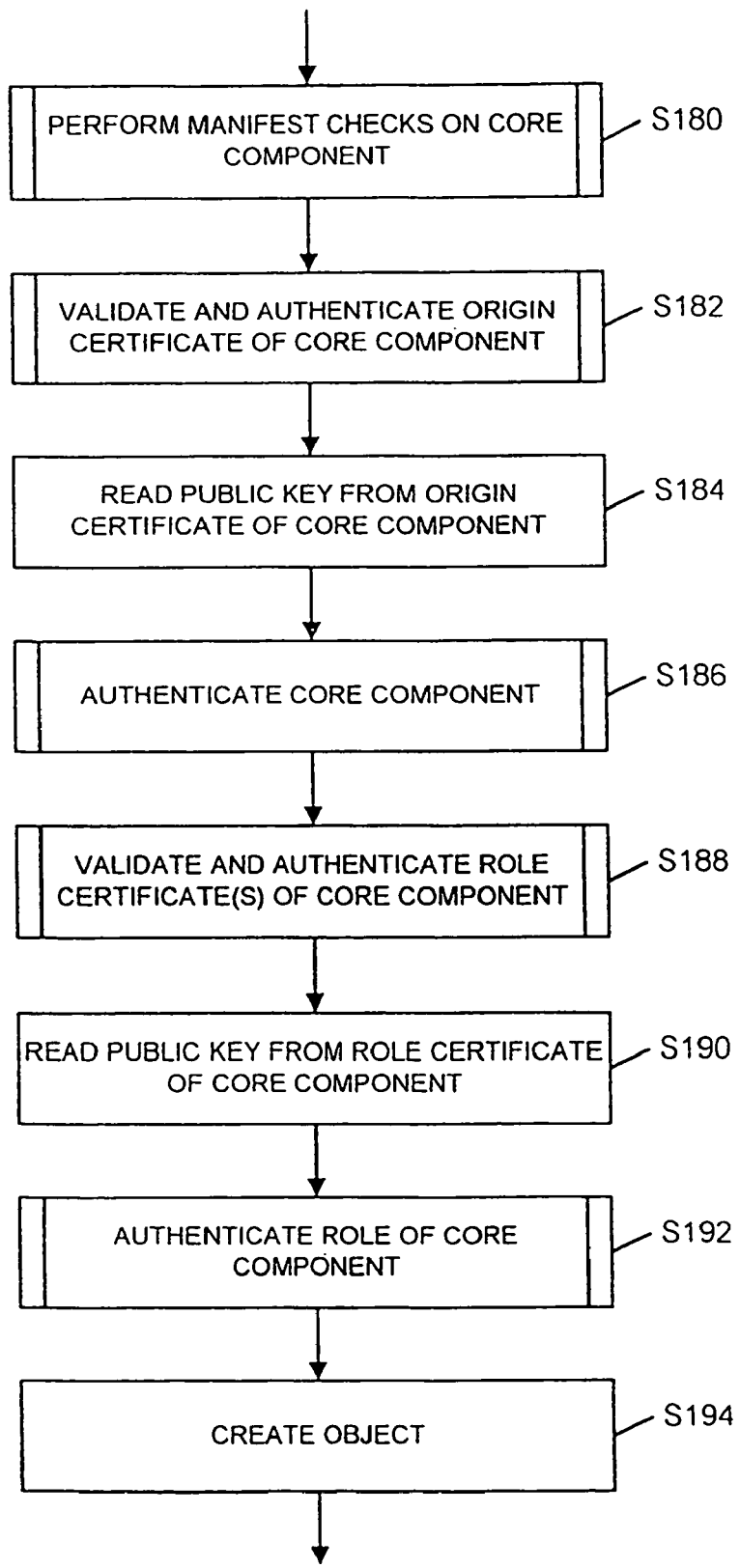
Figure 15:
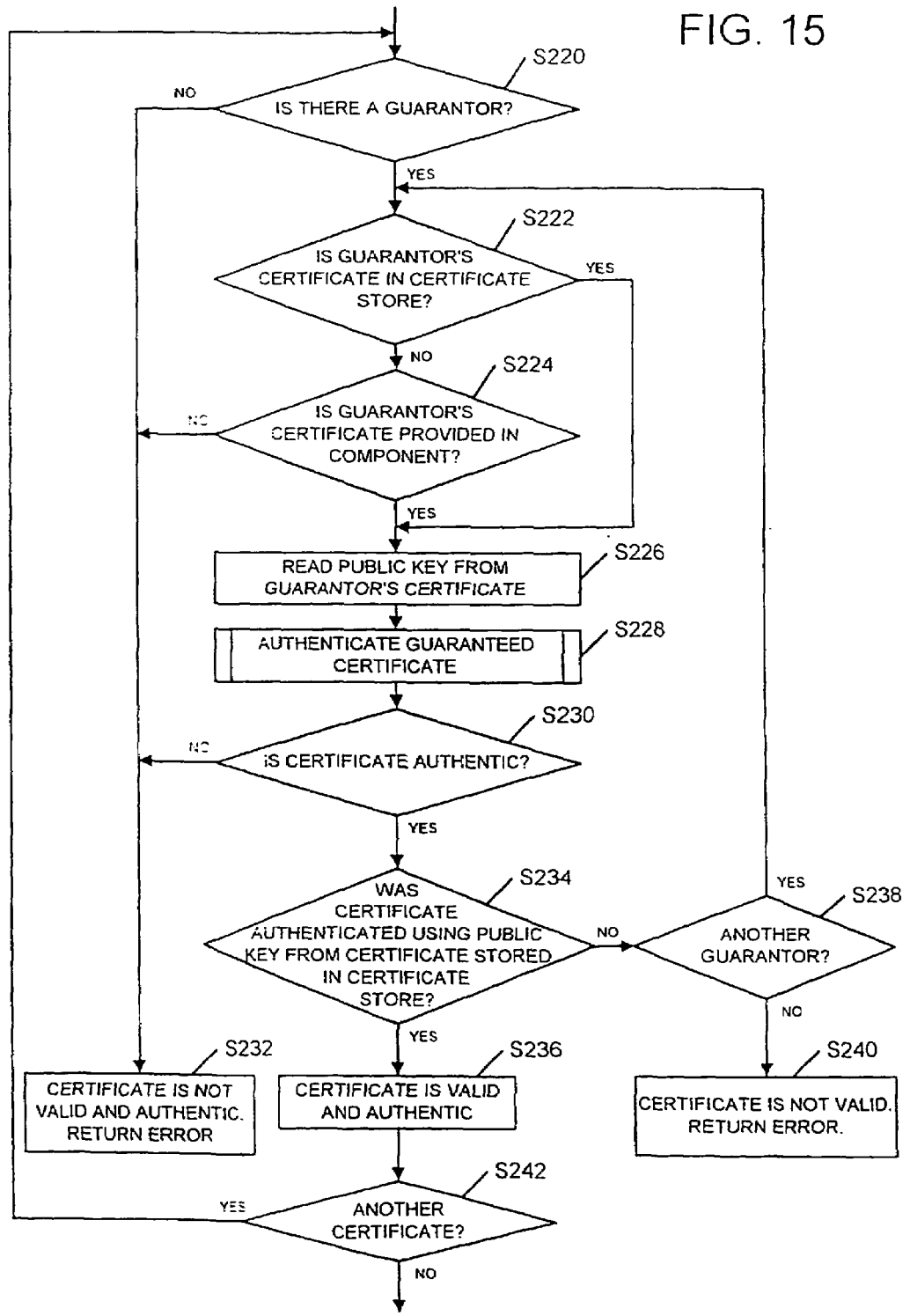
Figure 16:
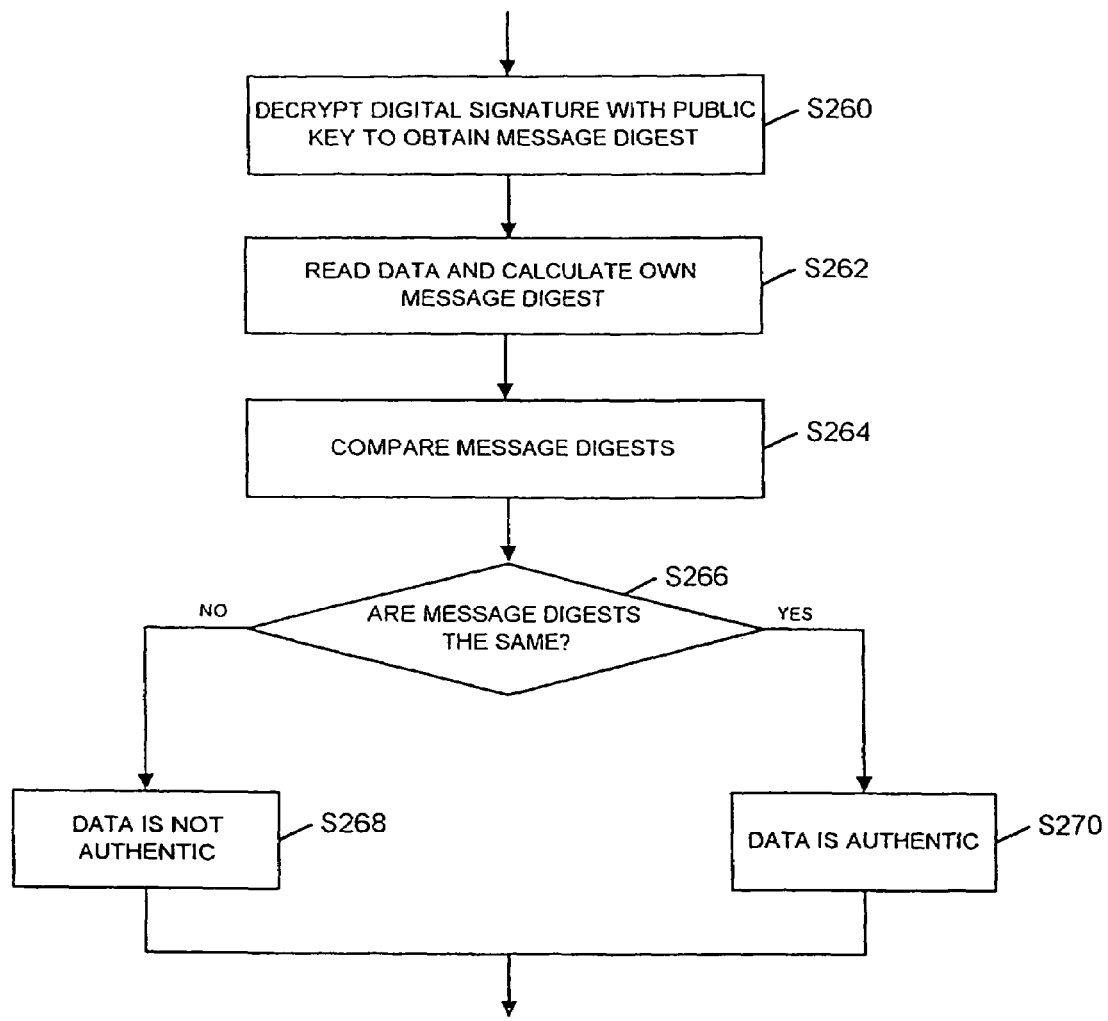
Figure 18:
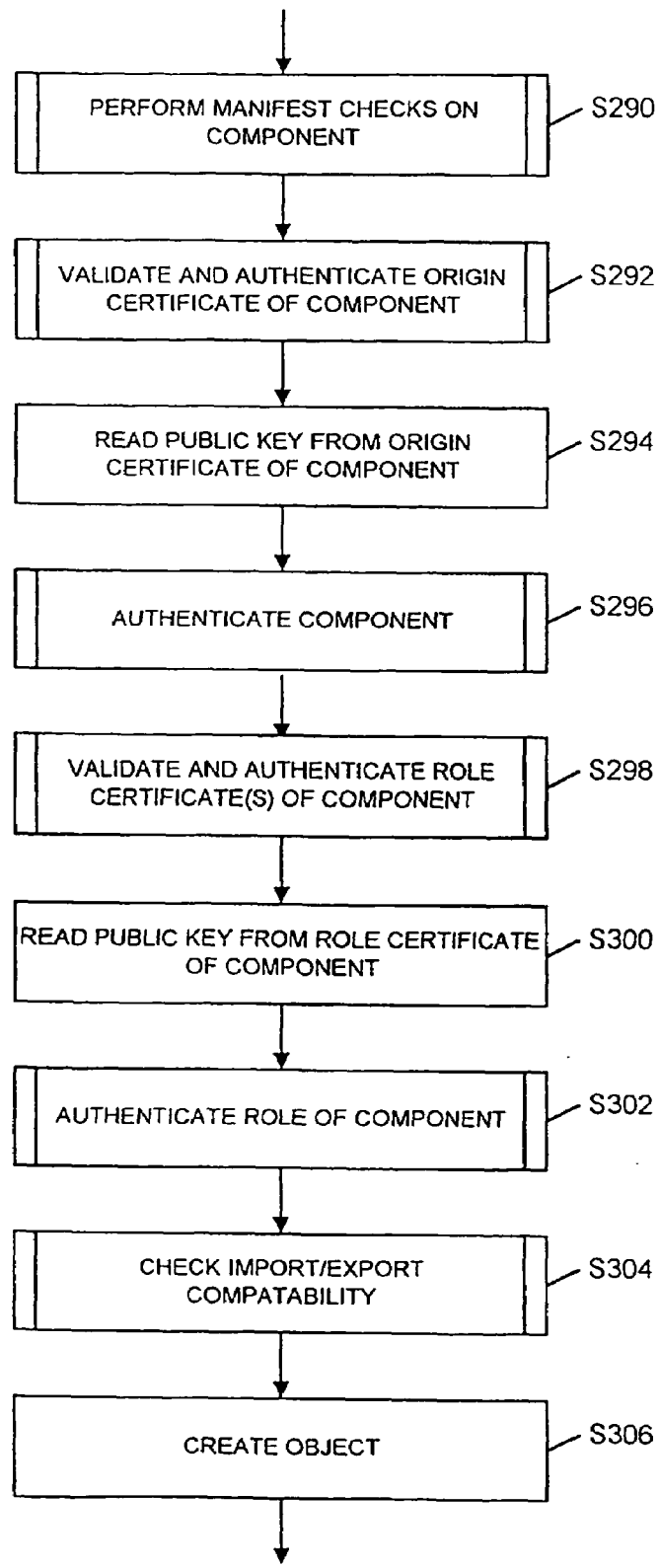
Figure 19:
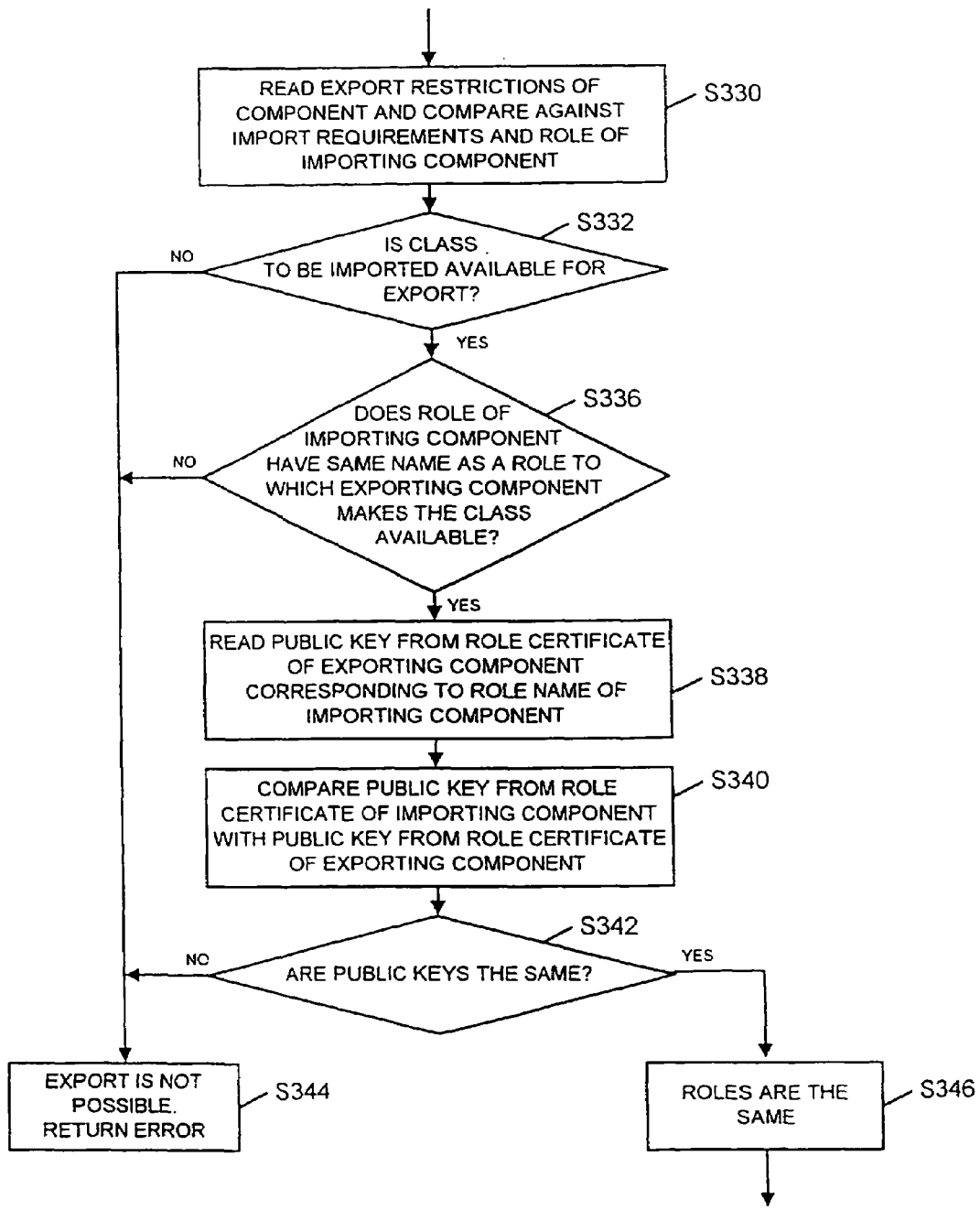
Figure 20:
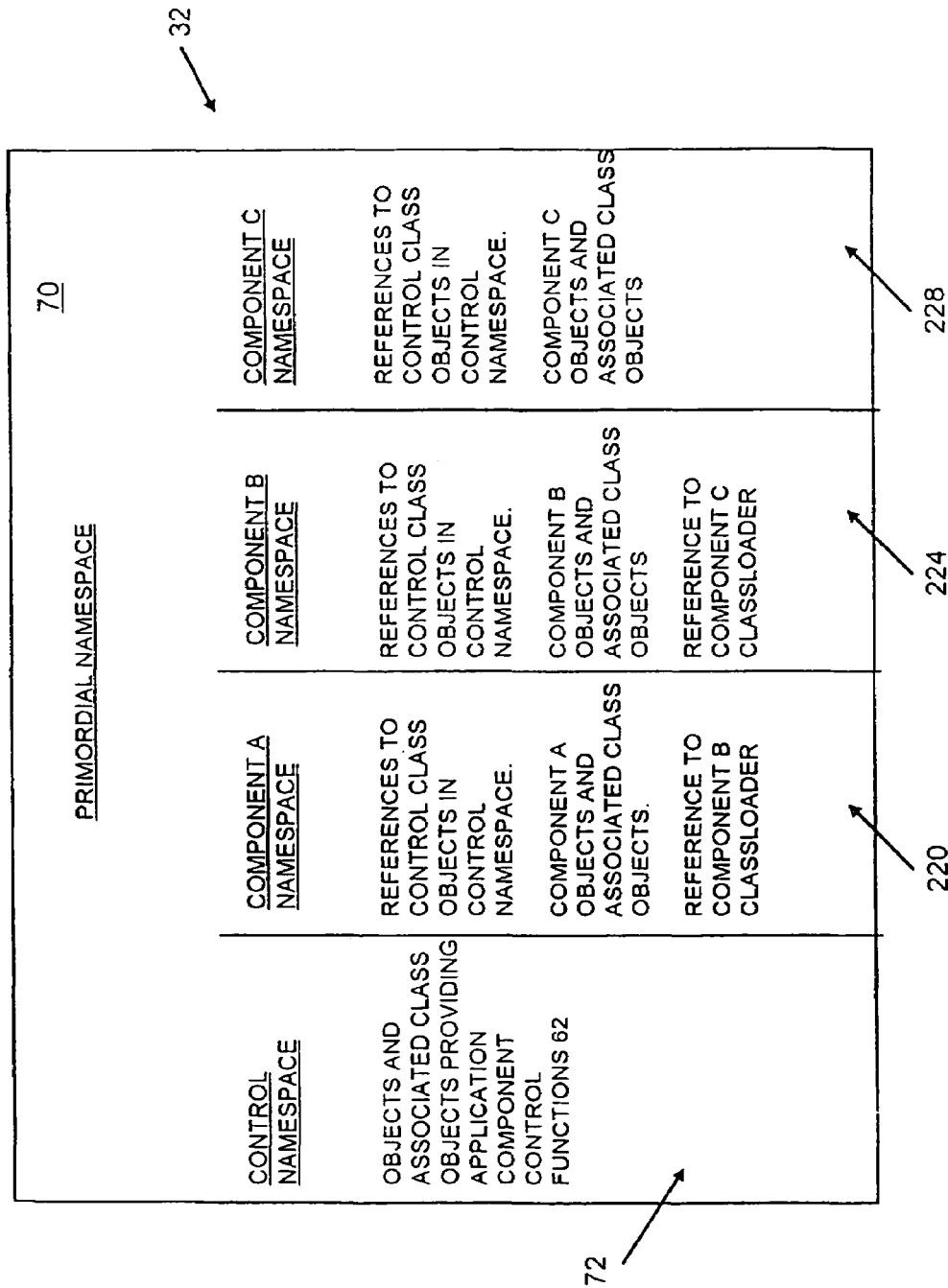
Figure 21:
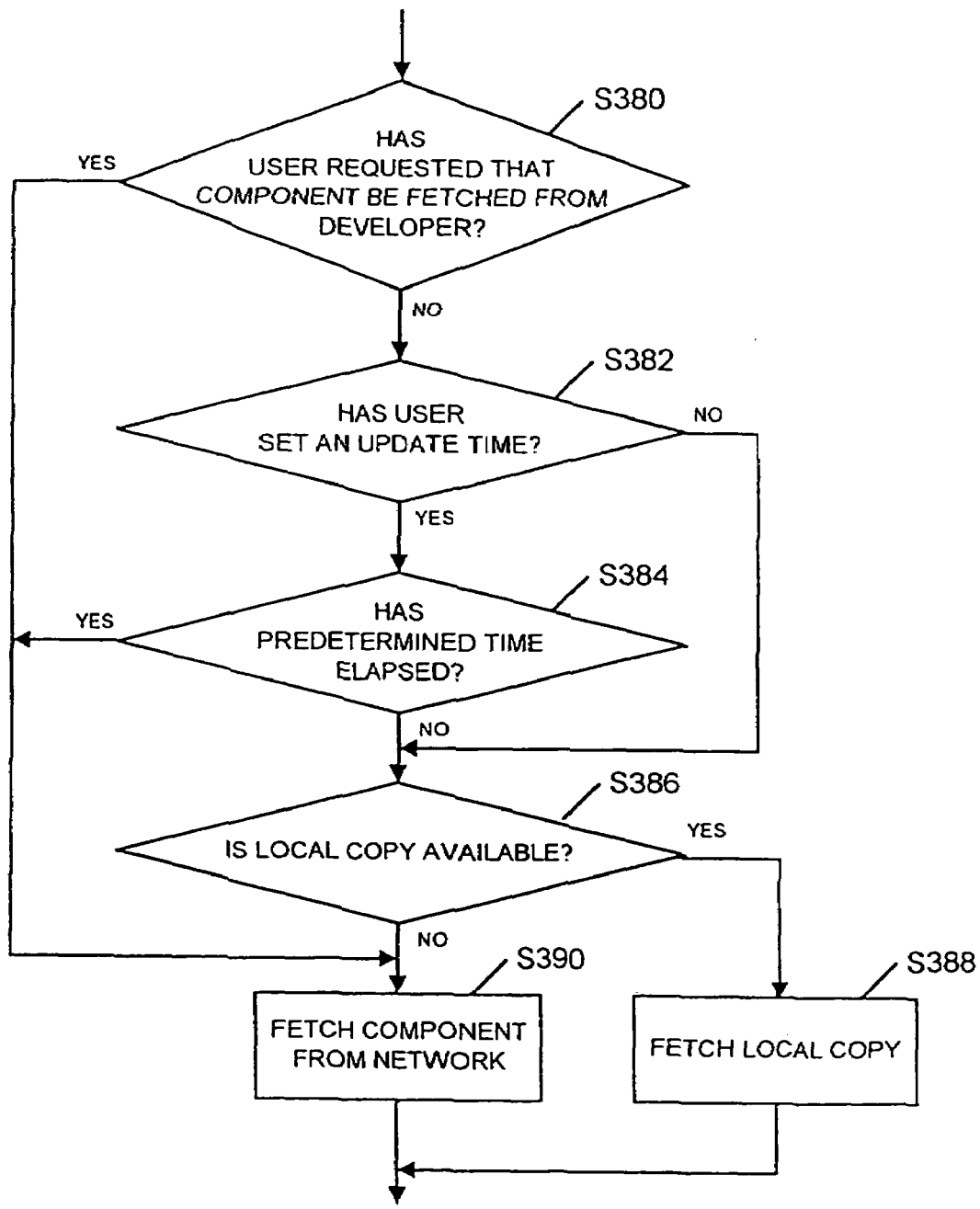
Figure 22:
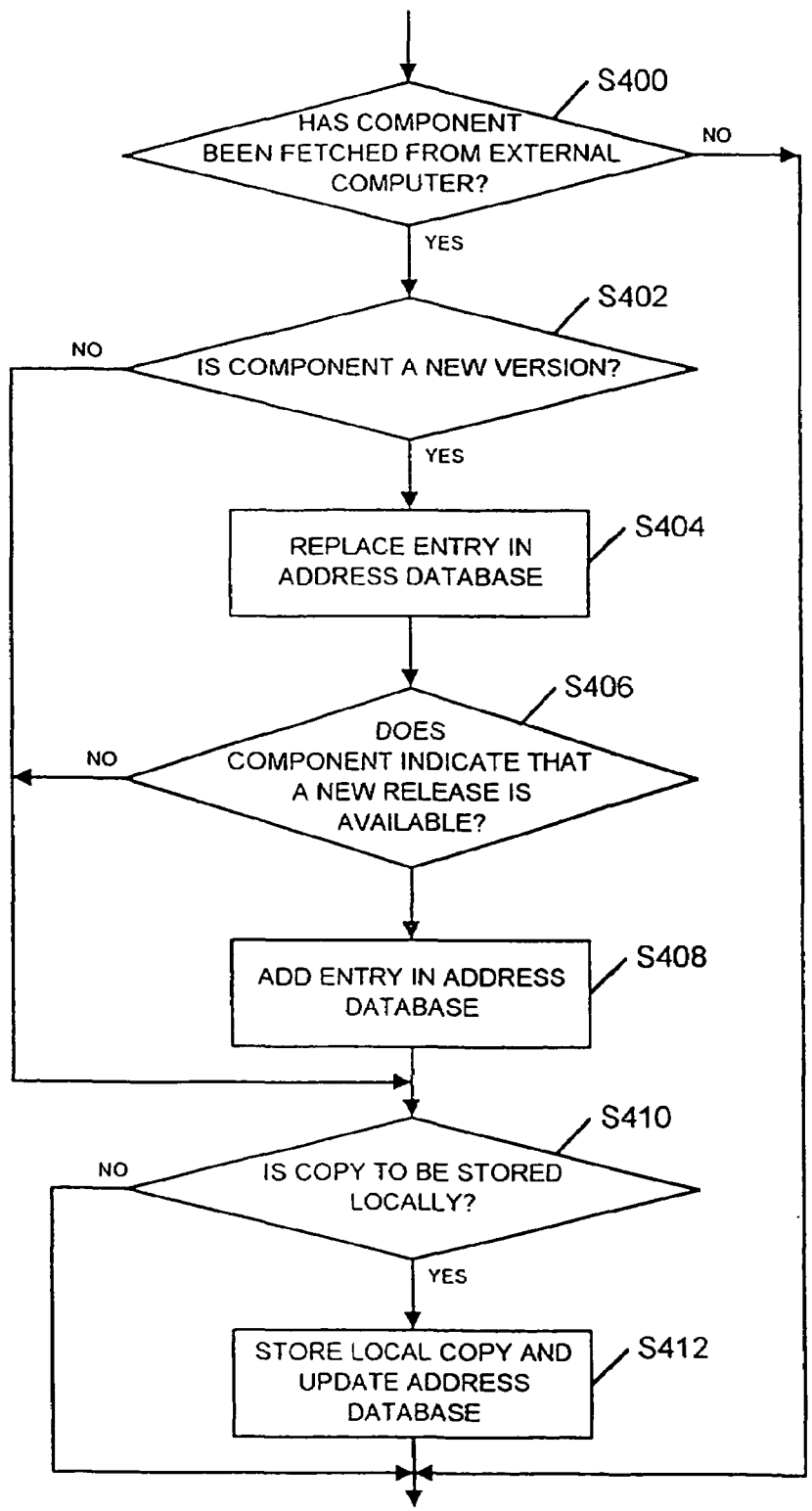
Figure 23:
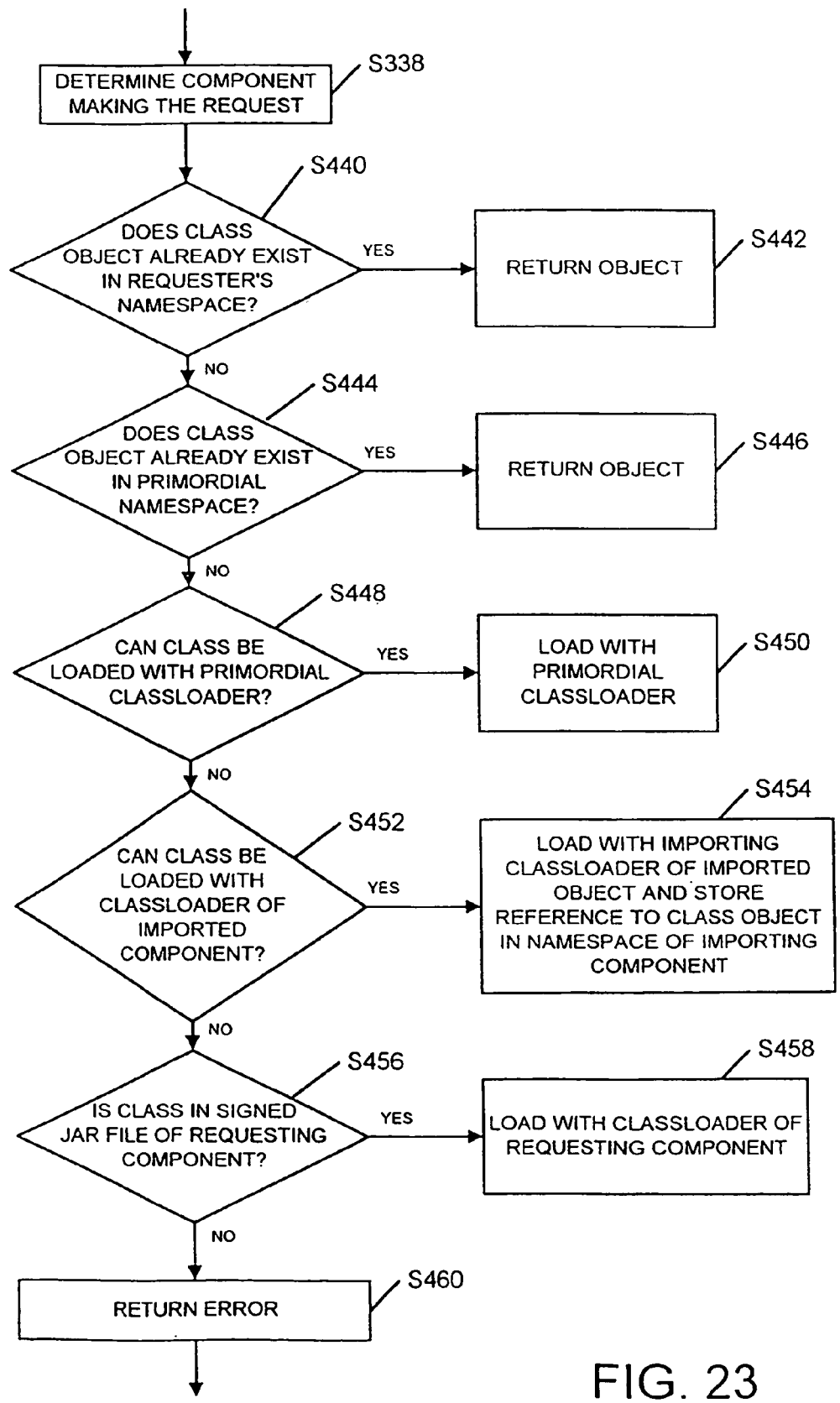
Figure 24:
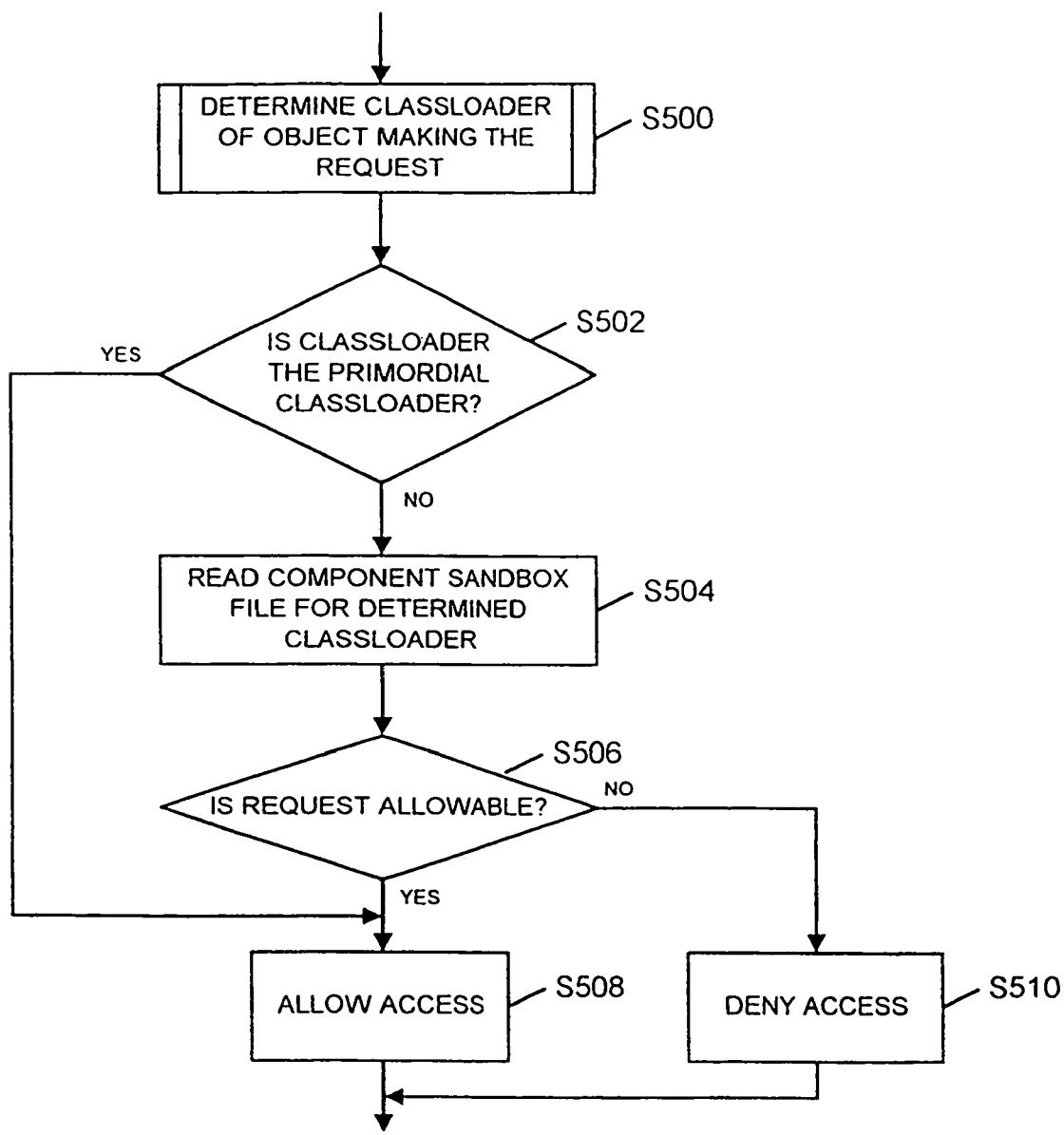
Figure 25:
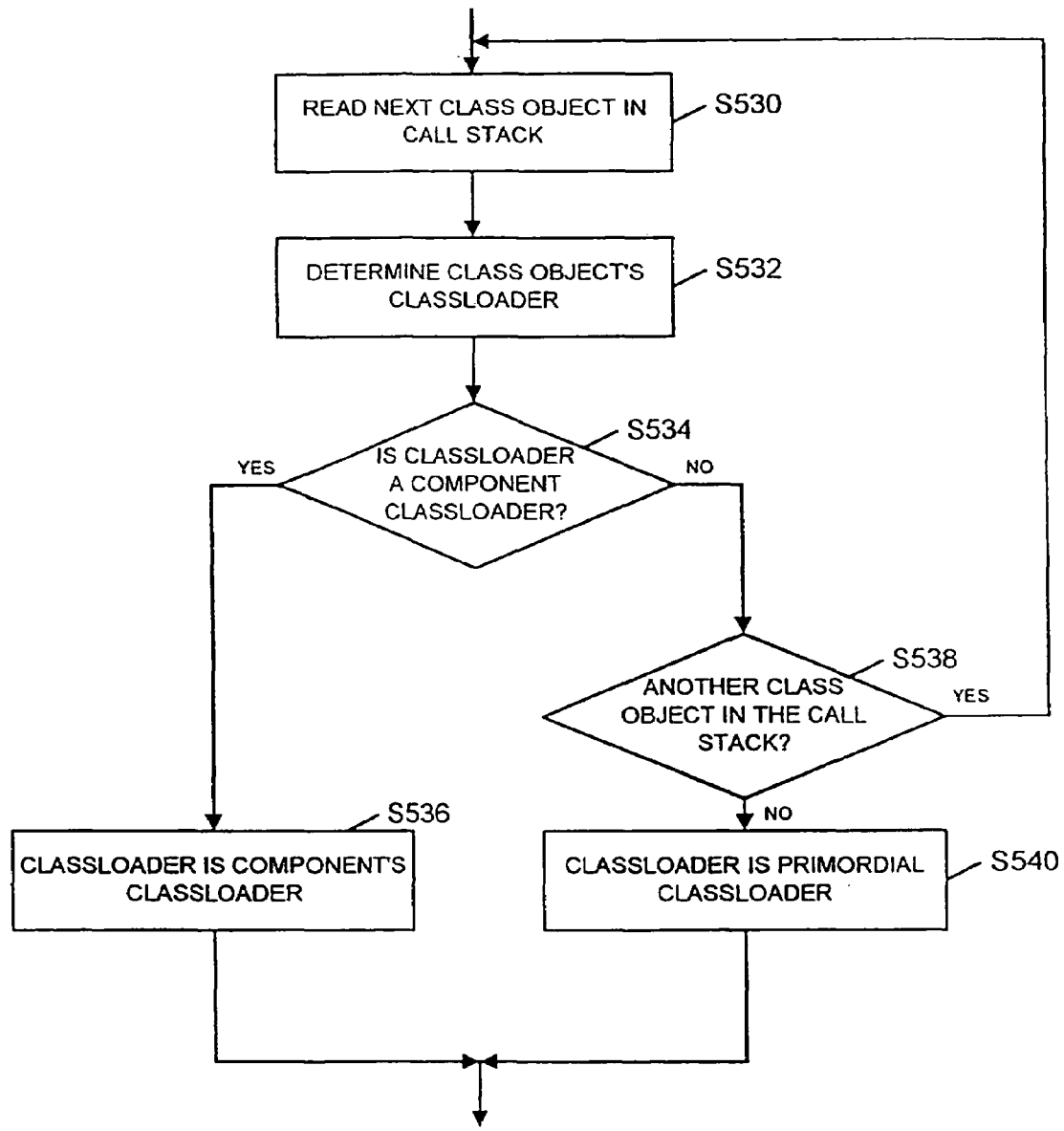

FIG. 4 schematically illustrates the input of data to computer 2 to form application component control functions in the Java virtual machine;

FIG. 5 shows the processing operations performed to load the application component control functions in FIG. 4;

FIG. 6 shows the processing operations performed to carry out manifest checks at step S8 in FIG. 5, at step S180 in FIG. 14 and step S290 in FIG. 18;

FIG. 7 schematically illustrates the namespaces created in the Java virtual machine when step S12 in FIG. 5 is performed;

FIG. 8 shows the processing operations performed at step S20 in FIG. 5 when the thread is run;

FIG. 9 is a block diagram schematically illustrating the functional components of the application component control functions 62 in FIG. 4 after step S68 in FIG. 8 has been performed;

FIG. 10 shows the processing operations performed at step S70 in FIG. 8 to carry out login operations and to open the certificate store for the user;

FIGS. 11a, 11b and 11c schematically illustrate the information stored in the JAR files of components making up an example application to be run on computer 2;

FIG. 12 schematically illustrates the data stored in a certificate;

FIG. 13 shows the processing operations performed to load components for an application required by the user of computer 2;

FIG. 14 shows the processing operations performed at step S124 in FIG. 13 to create a signed JAR file object for the core component;

FIG. 15 shows the processing operations performed to validate and authenticate a certificate at step S182 and step S188 in FIG. 14 and step S292 and step S298 in FIG. 18;

FIG. 16 shows the processing operations carried out to authenticate data at step S186 and step S192 in FIG. 14, step S228 in FIG. 15, and step S296 and step S302 in FIG. 18;

FIG. 17 schematically shows the data stored in address database 92 of FIG. 9;

FIG. 18 shows the processing operation performed at step S124 of FIG. 13 to create a signed JAR file object for an imported component;

FIG. 19 shows the processing operations carried out at step S304 in FIG. 18 to check the import-export compatibility of components;

FIG. 20 schematically illustrates the namespaces within the Java virtual machine after the components shown in FIGS. 11a, 11b and 11c have been loaded in computer 2;

FIG. 21 shows the processing operations performed at step S122 in FIG. 13;

FIG. 22 shows the processing operations performed at step S126 in FIG. 13;

FIG. 23 shows the processing operations performed when an application is run and a request is made for a Java class file;

FIG. 24 shows the processing operations performed to control access of components making up an application to system resources; and FIG. 25 shows the processing operations performed at step S500 in FIG. 24 to determine the classloader of the object making a request for a systems resource.

CONFIGURING THE APPARATUS

Figure 1:
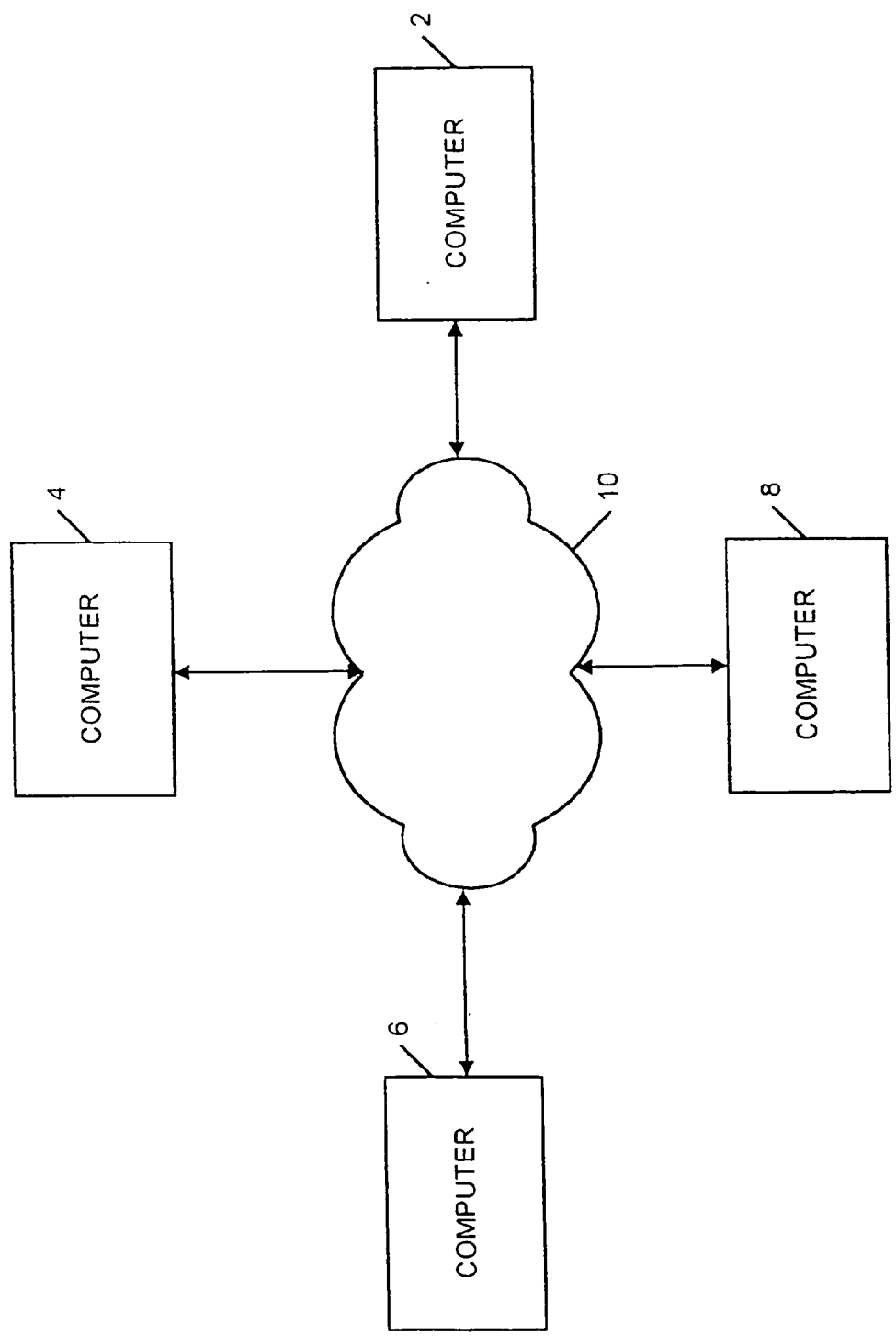
FIG. 1 shows a networked system of computers in an embodiment.

Referring to FIG. 1, in this embodiment, a plurality of computers 2, 4, 6, 8 are interconnected via a communication path 10, such as the Internet, a local area network (LAN), etc.

Each computer 2, 4, 6, 8 includes a processing unit having conventional components which include, inter alia, a central processing unit (CPU) and a memory.

In this embodiment, computer 2 is a personal computer (PC) for use by a user, while computers 4, 6 and 8 are servers storing data to be sent to computer 2 over the communication path 10.

Figure 2:
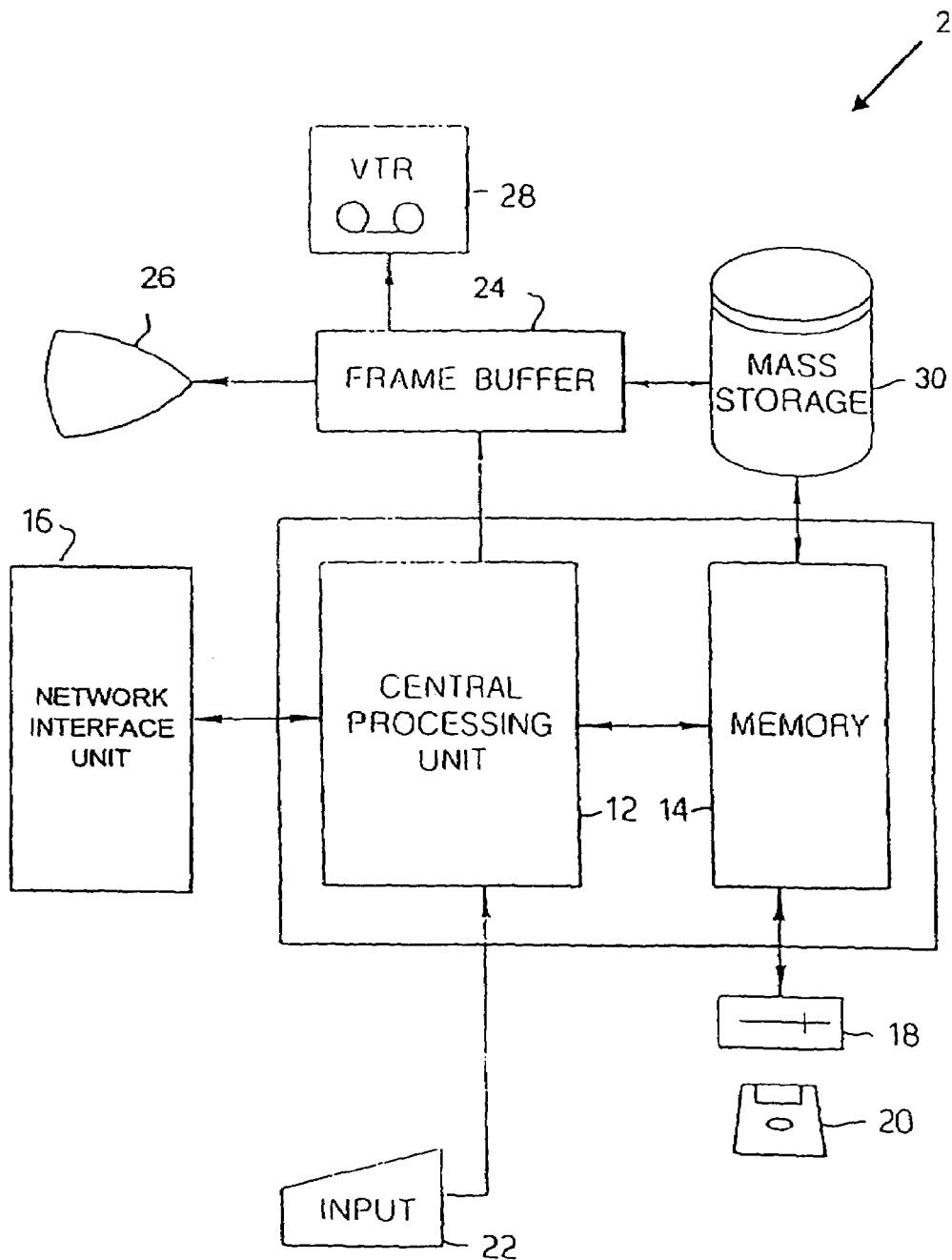
FIG. 2 is a block diagram schematically showing functional components of computer 2 in FIG. 1.

FIG. 2 schematically shows the components of the computer apparatus 2 in this embodiment. Referring to FIG. 2, in the apparatus, there is provided a CPU 12 connected to a memory 14 operable to store a program defining the operations to be performed by CPU 12, and to store data processed by CPU 12.

Coupled to central processing unit 12 is a network interface unit 16, such as a modem, to facilitate the connection of computer 2 to the communication path 10.

Coupled to the memory 14 is a disk drive 18 which is operable to accept removable data storage media, such as a disk 20, and to transfer data stored thereon to memory 14. Operating instructions for the CPU 12 may be input to the memory 14 from a removable data storage medium using the disk drive 18.

Data to be processed by CPU 12 may also be input to the computer 2 from a removable data storage medium using the disk drive 18. Alternatively, or in addition, data to be processed may be input via the network interface unit 16 or a connection (not shown) from a local or remote database.

Coupled to an input port of CPU 12, there is a user instruction input device 22, which may comprise, for example, a keyboard and a position sensitive input device such as a mouse, a trackerball, etc.

Also coupled to CPU 12 is a memory buffer 24, which comprises a frame buffer arranged to store image data relating to an image generated by CPU 12, for example by providing a memory location for each pixel of the image. The value stored in frame buffer 24 for each pixel defines the colour or intensity of that pixel in the image.

Coupled to the frame buffer 24 is a display unit 26 for displaying image data stored in frame buffer 24 in a conventional manner. Also coupled to frame buffer 24 is a video tape recorder (VTR) 28 or other image recording device, such as a paper printer.

A mass storage device 30, such as a hard disk drive, having a high data storage capacity, is coupled to the memory 14 (typically via CPU 12), and also to the frame buffer 24. The mass storage device 30 can receive data processed by CPU 12 from the memory 14 or data from the frame buffer 24 which is to be displayed on display unit 26. Data processed by CPU 12 may also be exported from computer 2 by storing the data via disk drive 18 onto a removable storage device, or by transmitting the data as a signal, for example via the network interface unit 16, to a receiving apparatus.

Operating instructions for causing computer 2 to perform as an embodiment of the invention can be supplied commercially in the form of programs stored on disk 20 or another data storage medium, or can be transmitted as a signal to computer 2, for example over communication path 10, so that the receiving computer 2 becomes reconfigured into an apparatus embodying the invention. The operating instructions may also be input via user-input device 22.

In this embodiment, computer 2 is loaded with instructions which configure it to act as a Java virtual machine. The Java language and the Java virtual machine are well known to the skilled person, and are described for example on the Internet at http://www.javasoft.com/docs/books/vmspec/index.html, and in "The Java Programming Language" by K. Arnold and J. Gosling, Addison-Wesley, 1996, ISBN 0201310066, and "Java Security: Hostile Applets, Holes and Antidotes" by G. McGraw and E. W. Felten, J. Wiley & Sons, 1997, ISBN 0-471-17842-X.

By way of background, the native operating system of a computer upon which an application runs provides access to the various resources required by the application, for example memory storage, network access and display facilities etc. Different operating systems require applications to access each of these resources in different ways. As well known, however, the Java virtual machine provides an environment in which applications can be run independent of the computer operating system, the interaction between the application and the operating system being via the Java virtual machine, which acts as an interface.

Figure 3:
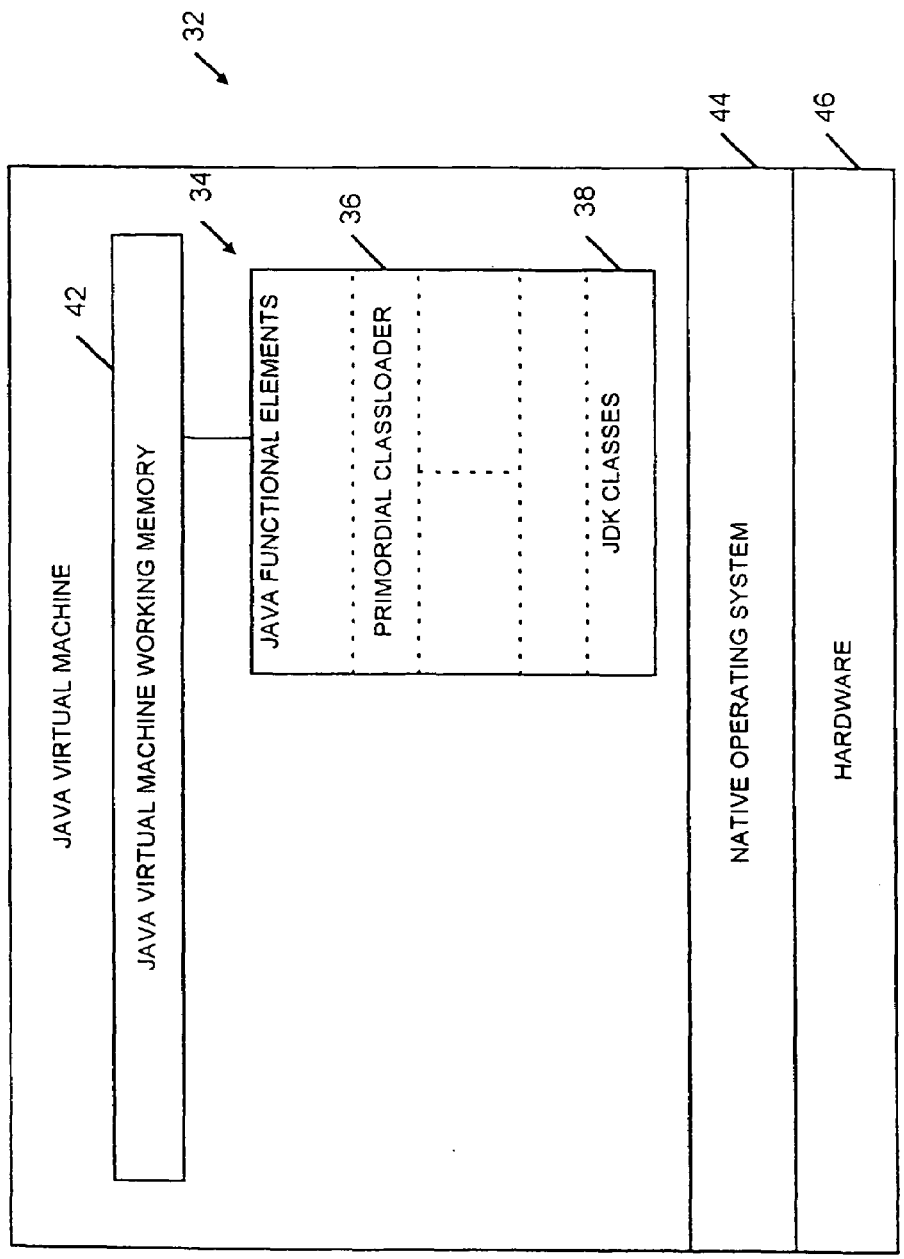
FIG. 3 is a block diagram schematically showing the arrangement of a Java virtual machine, native operating system and hardware of computer 2 in FIG. 1.

FIG. 3 schematically shows the configuration of computer 2.

Referring to FIG. 3, the Java virtual machine 32 includes Java functional elements 34 (Java classes) and a Java virtual machine working memory 42. The Java virtual machine 32 effectively provides a layer in which the Java functional elements 34 and processing applications (also in the form of Java classes) may be run. The Java functional elements 34 are conventional, and include, inter alia, a primordial classloader 36, which retrieves the data that forms a Java class's byte code and converts it to executable code in memory (forming an object and an associated class object), and Java development kit (JDK) classes 38, which provide access from the Java virtual machine 32 to the native operating system 44, and other functions such as sorting, data structures, lists, vectors, etc. The native operating system 44 controls access to the apparatus hardware 46.

In this embodiment, prior to loading a processing application to be run by computer 2, data is input into the Java virtual machine 32 to provide computer 2 with functionality for loading, running and maintaining the application in a desired way.

FIG. 4 schematically shows the data which is input to the Java virtual machine 32 to provide computer 2 with this functionality.

Referring to FIG. 4, data defining an initialisation file 50, a boot JAR file 52, a control JAR file 54, a platform security level file 56, a security certificates database 58, message digest algorithms 60, and application data 61 are input to the Java virtual machine, for example as data stored on storage medium 20 via disk drive 18, or as a signal via network interface unit 16 or other external connection (not shown). The data provides computer 2 with application component control functions 62.

The boot JAR file 52 and the control JAR file 54 have the format of a conventional JAR file (JAR standing for Java ARchive), for example as described on the Internet at http://java.sun.com/products/jdk/1.1/docs/guide/jar/jar-Guide.html. Initialisation 50, platform security level file 56, certificates 58, message digest algorithms 60 and application data 61 are data files.

Initialisation file 50 defines the storage location of the control JAR file 54 and the platform security level file 56, so that these files can be retrieved once input into computer 2.

Boot JAR file 52 contains Java classes for providing computer 2 with sufficient functionality to boot the application component control functions 62.

Control JAR file 54 contains Java classes to provide the functional components of the application component control functions 62.

Platform security level file 56 contains data defining the maximum level of access that is to be permitted to the resources of computer 2. In this embodiment, the level of access to each system resource can take one of two values, with one value indicating that an application is allowed access to the specified system resource and the other value indicating that an application is not allowed access to that system resource. An example format for a security level file 56 is given in Annex A.

Certificates database 58 contains CCITT X.509 standard certificates for use in verifying and authenticating components making up an application to be run on computer 2.

Each certificate input in certificates database 58 comprises a certificate from a trusted authority, such as a root certification authority.

Message digest algorithms file 60 comprises conventional algorithms, such as SHA-1 and MD5, for calculating message digests.

Application data 61 comprises data defining at least one "core" component for each application that the user of computer 2 is likely to want to run.

The input files 50–61 and the application component control functions 62 will be described further below.

FIG. 5 shows the processing operations performed in computer 2 to configure the Java virtual machine 32 to provide the application component control functions 62 using the input files 50–61.

In the description of FIG. 5 (and other figures) which follows, reference is made to the creation of objects in the Java virtual machine 32 by classloaders. As is well known to persons skilled in the art, when a classloader is used to create executable code in Java virtual machine working memory 42, an object and an associated class object are created. The object stores data, while the class object defines executable methods. The data within an object cannot be read directly, and instead must be read by calling a method within the class object. The class object also defines the name of the Java class and the classloader with which it was loaded, thereby defining the type of the class object. In the description below, for simplicity, reference will be made to "an object" being created by a classloader. However, it should be understood that this includes the creation of an object and the associated class object. As in a convention Java virtual machine, class objects are considered to be of the same type if they have the same name (that is, they have been created from the same class bytes) and have been created by the same classloader. In addition, the class object can inherit properties from a parent class object in a conventional manner.

Referring to FIG. 5, at step S2, an object for the initialisation file 50 is created within the Java virtual machine 32 using the primordial classloader 36 provided within the Java functional elements 34.

At step S4, the initialisation file object created at step S2 is called to read the initialisation file 50 and to determine from the information therein the location of the control JAR file 54.

At step S6, the primordial classloader 36 is used to construct a JAR file object using a class within the boot JAR file 52 specifically provided for constructing this object. The JAR file object thus created allows subsequent JAR files to be read, checked and understood by the Java virtual machine 32.

At step S8, manifest checks are performed on the control JAR file 54, which was previously located at step S4. These checks are carried out using functionality provided by the JAR file object created at step S6 from the boot JAR file 52, and determine whether the data within the files has been modified or corrupted since the JAR file was created.

FIG. 6 shows the processing operations performed to carry out the manifest checks at step S8.

Referring to FIG. 6, at step S40, a message digest of the data in the first file of the control JAR file is calculated using at least one predetermined conventional algorithm, such as SHA-1. At this step, further message digests of the file may be calculated using respective different conventional algorithms, such as MD5 etc.

At step S42, the message digest calculated at step S40 is compared with the message digest for the given file which is stored in the manifest file of the control JAR file. The manifest file may contain a plurality of message digests for a given file, each calculated with a different algorithm. In this case, if more than one message digest is calculated at step S40, then all of the calculated message digests are compared against those stored in the manifest file.

At step S44, it is determined whether the message digests compared at step S42 are the same (that is, identical). If the digests are not the same, then, at step S46, an error is returned and no further processing takes place since the data read from the control JAR file within computer 2 is not the same as the data within the file when it was created. On the other hand, if it is determined at step S44 that the digests are the same, then processing proceeds to step S48, at which it is determined whether there is another file within the control JAR file to be checked. Steps S40 to S48 are repeated until all files within the control JAR file have been manifest checked in the manner described above.

Referring again to FIG. 5 at step S12, a classloader object for the control JAR file is created using the primordial classloader 36. The classloader object for the control JAR file thus created can then be used to read classes from the JAR file object created at step S6 and to create objects therefor in the Java virtual machine 32 by converting the class byte code into executable code in Java virtual machine working memory 42. A classloader can create objects only from class files contained in its own signed JAR file. As is well known to the skilled person, every object created by a classloader is tagged with a reference to that classloader. A classloader maintains references to all of the objects it has created in a hashtable keyed on the object name. When a class object in the Java virtual machine working memory 42 calls another class object, the Java virtual machine 32 directs the call to the classloader of the calling object. This means that a classloader defines a "namespace" within the Java virtual machine, and is able to regulate the objects loaded into that namespace. A classloader ensures that class objects may only access other class objects within the same namespace. An object created by a classloader cannot be changed by a user of computer 2.

FIG. 7 schematically shows the namespaces within the Java virtual machine after step S12 has been performed.

Referring to FIG. 7, the Java virtual machine 32 includes an overall primordial namespace belonging to the primordial classloader 36 provided within the conventional Java functions 34, and a control namespace 72 provided by the control JAR file classloader created at step S12. The control namespace 72 is within the primordial namespace 70 since the control JAR file classloader was created at step S12 by the primordial classloader 36.

The way in which the objects and associated class objects are loaded into control namespace 72 to form the application component control functions 62 will now be described.

Referring again to FIG. 5, at step S14, the control JAR file classloader created at step S12 is used to create a top-level (overall) thread group object for the control JAR file 54 and a control thread group object in the central namespace 72.

At step S16, the control JAR file classloader created at step S12 calls the JAR file object created at step S6 to read the control class file and creates a control object therefrom.

At step S18, the control JAR file classloader creates a thread object in the control thread group created at step S14, and passes the control object created at step S16 to the thread object.

At step S20, the thread for the control object is run to load classes from the control JAR file to create functional units.

FIG. 8 shows the processing operations performed at step S20.

Referring to FIG. 8, at step S60, the control JAR file classloader created at step S12 (FIG. 5) calls the initialisation file object created at step S2 to read the initialisation file 50 to locate the platform security level file 56.

At step S62, the control JAR file classloader creates a platform sandbox object from the platform security level file.

At step S64, the control JAR file classloader creates a system resources security manager object and passes it the platform sandbox object created at step S62. The security manager object created at this step is the same "type" of object as the conventional Java security manager provided in the Java functional elements 34. Accordingly, the security manager object created at step S64 inherits from the conventional Java security manager.

At step S66, the Java functional elements 34 are instructed to use the security manager object created at step S64 instead of the conventional Java security manager, thereby installing the new security manager.

As a result of step S60 to S66, a new security manager to replace the conventional Java security manager provided within the Java functional elements 34 is installed at an early stage in the start up, and in particular before any data from an external supplier is loaded.

At step S68, the control JAR file classloader 36 created at step S12 creates objects for the remaining classes in the JAR file object created at step S6 which define control functionality.

As a result of the above processing operations, computer 2 is configured to provide all of the functionality defined in the control JAR file 54.

FIG. 9 is a block diagram schematically showing the functional components within the application component control functions 62 which, in effect, are provided as a result of creating objects from the classes in the control JAR file 54.

Referring to FIG. 9, the functional components within the application component control functions 62 comprise the following, which will be described in further detail later:

A central controller 80 with working memory 82 for controlling the overall operation and interaction of the functional units within application component control functions 62, and for controlling the interaction of the application component control functions 62 with the Java functional elements 34 and the Java virtual machine working memory 42.

A thread manager 84 for controlling the set-up and running of threads for different processes.

A user interface unit 86 for controlling the input of information by a user and the output of information to the user.

A component loader 88 for loading components into computer 2 to make up a processing application to be run by the computer. The component loader 88 is connected to an address database 92, in which one or more universal resource locaters, URLs, (that is, unique addresses) may be stored together with other application component data, and a network interface 94 for controlling the connection of application component control functions 62 to network interface unit 16.

A JAR file store 96 for storing JAR files, for example of application components loaded from communication path 10 via component loader 88.

An update instructions store 98 for storing user instructions defining when components making up an application should be updated.

An authentication controller 100 for processing data to confirm whether it is from the correct source and whether it has been changed. Authentication controller 100 is connected to certificate stores 102, which are for storing certificates input in certificates database 58. The certificates have a format in accordance with CCITT X.509 standard, and the data within the certificate stores 102 is encrypted. A certificate store is provided for each user of computer 2, with each store being identified by the user name of a user. Authentication controller 100 is also connected to a certificate structure store 103, which stores data from the control JAR file 54 defining the structure of the certificate data stored in each certificate store 102. This structure information is used when decrypting the data in a certificate store 102 (see later). Authentication controller 100 is further connected to message digest algorithm store 104, which is for storing SHA-1 and MD5 algorithms for calculating message digests input in the message digest algorithms file 60.

A system resources security manager 106 for controlling all access to the resources of computer 2 (including other processes running on computer 2). System resources security manager 106 is connected to an access level store 108, which stores the platform security level information from platform security level file 56. The platform security level information can be changed by a user to provide different maximum access levels, as required.

A classloader unit 110 (corresponding to the control JAR file classloader created at step S12) which is operable as described above.

An application database 112, which is for storing information from the application data 61 defining at least one core component and its universal resource locator for a number of different applications which are likely to be required by the user.

As schematically shown in FIG. 9, and as described above, within Java virtual machine 32, central controller 80 is connected to Java virtual machine working memory 42 and the Java functional elements 34, thereby provided access to these functional components for the application component control functions 62.

As will be described below, the application component control functions 62 control, inter alia, the loading of components making up an application, the upgrade of components, inter-component interaction, the interaction of components with system resources, and other aspects of component security and access control.

Referring again to FIG. 8, at step S69, certificates database 58 is input to computer 2 and the certificates are stored in certificate stores 102, message digest algorithms file 60 is input and the message digest algorithms are stored in message digest algorithm store 104, and application data file 61 is input and the application information is stored in application database 112.

At step S70 login operations are performed and the user's certificate store 102 is opened.

FIG. 10 shows the processing operations performed at step S70.

Referring to FIG. 10, at step S88, central controller 80 and user interface unit 86 request the user to input a user name, for example by displaying a request message on display device 26.

At step S90 the user name input by a user via input device 22 is read by central controller 80 and authentication controller 100.

At step S92, authentication controller 100 determines whether a certificate store 102 exists for the user name read at step S90. If no such certificate store exists, then it is determined that the user is not authorised to use the apparatus, and processing proceeds to step S108, at which an error is returned, thereby denying the user access to the functions within the application component control functions 62.

On the other hand, if it is determined at step S92 that a certificate store 102 does exist for the input user name, then, at step S94 central controller 80 and user interface unit 86 prompt the user to input his password, for example by displaying a message on display device 26.

At step S96, the password input by the user is read by central controller 80 and authentication controller 100, and at step S98, authentication controller 100 converts the password to a cryptographic key by using the RSA PKCS#12 standard.

At step S100, authentication controller 100 decrypts the certificate store 102 identified for the user at steps S90 and S92 with the key created at step S98.

At step S102, central controller 80 and authentication controller 100 determine whether the certificate store decrypted at step S100 has been decrypted correctly. More particularly, central controller 80 and authentication controller 100 read the certificate structure information stored in certificate structure store 103, and central controller 80 requests the Java functional elements 34 to read the certificate information decrypted at step S100 using the structure read from the certificate structure store 103. If the decryption was not successful, the Java functional elements 34 return an error since the decrypted data will not have the defined structure, whereas no error is returned if the decryption was performed correctly.

If it is determined at step S102 that the certificate store 102 is not decrypted correctly, then it is determined that the user's password is incorrect and, at step S108, central controller 80 returns an error, thereby denying the user access.

On the other hand, if it is determined at step S102 that the certificate store 102 has been decrypted correctly, then, at step S104, central controller 80 and authentication controller 100 perform an integrity check on the data within certificate store 102. This is performed using a conventional HMAC check in accordance with the RSC 2104 standard, in which the data in the certificate store is encoded to give a value which is then compared against the value generated the last time the certificate store 102 was closed.

At step S106, central controller 80 and authentication controller 100 determine whether the integrity check performed at step S104 was successful (that is, whether the data in certificate store 102 has not changed, and hence the integrity values compared at step S104 are the same).

If it is determined at step S106 that the integrity check was not successful, then, at step S108, central controller 80 returns an error. On the other hand, if it is determined at step S106 that the integrity check performed at step S104 was successful, then, at step S110, it is determined that the login has been successful and the user is allowed to access the application component control functions 62.

Steps S98 to S110 described above are carried out since user passwords are never stored in the apparatus, thereby improving security.

Having completed the operations described above, the functional units within the application component control functions 62 are fully installed, operable, and accessible by the user. Accordingly, the apparatus is now ready to load an application selected by the user.

Loading an Application

In this embodiment, an application is created from a number of separate components which make up the application. Each of the components is stored in a computer connected to communication path 10. Computer 2 is arranged to identify and gather the necessary components and to configure them to create the desired application.

This embodiment is applicable to any processing application. For example, a word processing application may be made up from separate components comprising, inter alia, a graphical user interface (GUI) component, a file format component, a spellchecker component, a printing component etc. Similarly, an application for controlling on-line (electronic) purchasing of goods may be made up from components comprising a component from a vendor enabling a user (customer) to order goods, a component from a supplier to the vendor enabling the user to view specifications of the goods from that supplier, and a component from a bank which debits an amount from the customer's account when the goods are ordered. Such an application will be described in further detail later.

However, for illustration purposes, a general example will be described in which an application consists of three components, namely component A, component B and component C, stored respectively on computer 4, computer 6 and computer 8. Of course, this is merely an example, and an application may consist of any number of components, and more than one component may be stored on a single computer connected to communication path 10.

FIGS. 11*a*, 11*b* and 11*c* schematically illustrate the data making up a component of an application. This data is stored in the form of a conventional JAR file 140. Referring to FIGS. 11*a*, 11*b* and 11*c*, the information stored in a component JAR file 140 comprises:

A component control class file 142. This file stores information defining the component name which, in this embodiment, contains the supplier's name and the component name in the form "supplier.component". The "supplier" part of the name is referred to as the name prefix.

The component control file 142 also stores data defining the version of the component in the form "X.Y", where X is the release (or major version) number of the component and Y is the version (or minor version) number of the component. A component is given a new release (major version) number if there are any major functionality changes, and in particular if the classes exported by the component (see below) have changed their interface. Every new release of a component is given its own unique universal resource locator, thereby enabling components that rely on specific releases of other components to continue to work after a new release, as will be explained later. The component is given a new version (minor version) number if changes such as bug fixes or minor extensions in functionality are delivered but the export classes have not changed their interface in any way. This ensures that versions of a given release are always interchangeable, and a new version of a component will not, therefore, change its universal resource locator.

Import and Export information is stored in component control class file 142 defining the interface of the component with other components. The import information defines the component(s) required to be used with the component in the generation of an application, the particular class(es) within each of those components that are required, and the universal resource locator of each component to be imported. In the example of FIG. 11*a*, the import information specifies that component A requires the use of class B1 within component B. The export information defines the functional Java classes (see below) within the component which are available to other components with a specified user group. Referring to the example shown in FIG. 11*b*, the export information defines that class B1 in component B is available to components having a role of X1 or X2, and that class B2 is available to components having a role of X3. The use of the import and export information will be described further below. It will be seen from the example in FIG. 11*a* that, in this example, component A does not export any Java classes, and from FIG. 11*c* that component C does not import any component classes.

Also stored in component control class file 142 are installation instructions defining how the component should be installed the first time it is loaded, and shut down instructions defining how the component should be shut down.

Java class files 144. These class files define instructions for causing compute 2 to perform the processing operations of the component. The functionality of a component is divided into a number of functional Java classes, for example A1 to An for component A.

Resource files 146. These define resources used by the component, such as Graphics Interchange Format (GIF), Joint Pictures Expert Group (JPEG), Audio etc.

A sandbox file 148. This file defines the system resources within computer 2 that the component is allowed to access. The format of this file is identical to the format of the platform security level file 56 (for example as set out in Annex A). The sandbox file 148 is signed as part of the component (see below) and therefore can not be altered once the component has been signed without signature checks revealing an error (to be described later).

Role certificates 150. This data comprises a CCITT X.509 standard certificate for the role of the component and a CCITT X.509 standard certificate for each role defined in component control class file 142 to which classes within the component are made available. Referring to FIG. 11*b*, by way of example, JAR file 140 for component B contains a role certificate for role Y1 since this is the role of component B, and a respective role certificate for each of roles X1, X2 and X3 since classes within component B are made available to other components having these roles.

FIG. 12 schematically shows the data stored in each certificate in accordance with CCITT X.509 standard. Referring to FIG. 12, a certificate 180 contains data 182 to be guaranteed, the data 182 comprising details about the supplier of public key 188 within the certificate 180, details of the guarantor 184, a digital signature 186 of the data 182 and 184, which is created using the private key of the guarantor detailed in data 184, and a public key 188 for decrypting data encrypted with the private key belonging to the supplier of data 182.

The role certificate 150 corresponding to the role of the component (for example role Y1 for component B) contains a public key 188 for decrypting the digital role signature of the component (see below). Since the digital role signature for a given component is created (see below) using the private key of the supplier of a different component from which the given component imports a class, the public key 188 within the role certificate 150 corresponding to the role of the component is the public key corresponding to the private key of the supplier of the different component. Referring to FIG. 11b and 11c, by way of example, the role certificate 150 corresponding to the role of component B (that is, role Y1) contains a public key for decrypting digital signatures created using the private key of the supplier of component C for role Y1, since component C makes available class C2 for export to components having role Y1.

Each role certificate 150 corresponding to a role defined in component control class file 142 to which classes within the component are made available, contains a public key 188 for decrypting digital signatures created using the private key of the supplier of the component itself. Referring to FIG. 11b, by way of example, the role certificate for role X1 contains a public key 188 for decrypting digital signatures created using the private key of the supplier of component B for role X1. Similarly, role certificate 150 for role X2 and role certificate 150 for role X3 also contain public keys 188 for decrypting digital signatures created using private keys of the supplier of component B. However, of course, the public key 188 within each role certificate 150 is different since the supplier of component B has a different private key for each of roles X1, X2 and X3.

An origin certificate 152. This comprises a CCITT X.509 standard certificate, as previously described with respect to FIG. 12. In the case of the origin certificate 152, data 182 comprises details of the supplier of the component, and the public key 188 is for decrypting the digital origin signature of the component (see below). The origin certificate 152 contains a domain name which corresponds to the prefix of the component name stored in the component control class file 142.

Guarantors certificates 154. These comprise CCITT X.509 standard certificates for guaranteeing the guarantor(s) of the role certificate(s) 150 and the guarantor of the origin certificate 152. Further certificates guaranteeing the guarantor on the guarantor certificates may be provided to establish a chain of certificates to define a chain of trust. This will be described further below.

A manifest file 156. This file stores two message digests for each class file within the component JAR file 140. That is, the manifest file contains two message digests for the component control class file 142, each of the Java classes within file 144, each of the resource files within file 146, the sandbox class file 148, the role certificate(s) 150, the origin certificate 152 and the guarantors certificates 154. The message digests are calculated using different algorithms and are recorded as Base64 encoded digests. In this embodiment, the conventional algorithms MD5 and SHA-1 are used. To ensure that the manifest file cannot be tampered with to cover up a change in one of the component's files, the manifest file is signed as part of the origin signature (see below).

A digital role signature 158. This is a digital signature for the role of the component, and is generated in a conventional manner using the following formula:

Digital Signature=
  Encrypt with
  Private Key [Digest (Message Data)]
  of Signer where "message data" is the data to be signed and, in this embodiment, comprises the data in manifest file 156, the message digest is performed using a predetermined conventional algorithm such as SHA-1 or MD5, and the private key used to encrypt the message digest is the private key for the role of the component belonging to the supplier of a different component which makes available a class for export to the component. Referring to FIG. 11a and 11b, by way of example, the private key used to create the digital role signature for role X1 of component A is a private key of the supplier of component B, since component B makes available a class (class B1) for export to a component having a role X1. The supplier of component B signs the manifest file 156 of component A with a private key for role X1 to create the digital role signature 158 after it has checked component A to ensure that the processing functions performed by it are satisfactory (that is, component A performs only processing functions which the supplier of component B will endorse). The digital signature is given an extension to indicate the signature algorithm used to create it.

A digital origin signature 160. This comprises a digital signature generated in the manner described to sign manifest file 156. In this case, however, the private key which is used to encrypt the data is a private key of the supplier of the component (this being different to the private key used to generate the digital role signature 158). Again, the digital signature is given an extension to indicate the signature algorithm used to create it.

In this embodiment, digital role signature 158 and digital origin signature 160 are provided as a single RSA PKCS#7 standard signed data construct. This construct allows multiple signatures to be applied to the data. Because the manifest file 156 is the data that is signed by the PKCS#7 construct, it can not be modified without signature checks performed by the application component control function 62 (see below) failing. In creating digital role signature 158 and the digital origin signature 160, because a message digest of the manifest file 156 is used, rather than all of the complete files themselves, the amount of data to be processed when verifying signatures is reduced.

FIG. 13 shows the operations performed by computer 2 in loading an application.

Referring to FIG. 13, at step S118, central controller 80 and interface unit 86 read instructions input by a user of computer 2 via input device 22 defining an application which the user wishes to use.

At step S120 central controller 80 identifies the core component for the application requested by the user at step S118. The user instructions input at step S118 may identify the core component and its universal resource locator. However, if this is not the case, in this embodiment, central controller 80 reads application database 112 and identifies a core component and its universal resource locator for the type of application requested by the user.

At step S122, central controller 80 and component loader 88 fetch the core component identified at step S120 and store it in JAR file store 96. More particularly, the universal resource locator of the core component is read, component loader 88 and network interface 94 connect the application component control functions 62 to communication path 10 via network interface unit 16, a connection and communication is established with the computer storing the core component, and the core component is downloaded therefrom to computer 2, where it is stored in JAR file store 96. The data defining the component may be transmitted to computer 2 using a standard protocol such as Hyper Text Transfer Protocol (HTTP), File Transfer Protocol (FTP), GOPHER or local FILE.

At step S124, the application component control functions 62 create a signed JAR file object in the control namespace 72 for the component stored at step S122.

FIG. 14 shows the operations performed at step S124 to create the signed JAR file object. Referring to FIG. 14, at step S180 central controller 80 and authentication controller 100 perform manifest checks on each file in the core component's JAR file 140. FIG. 6, described previously, shows the way in which this step is performed. Referring to FIG. 6, at step S40, a message digest is calculated by authentication controller 100 using an SHA-1 algorithm and a MD5 algorithm both stored in message digest algorithm store 104. As the steps in FIG. 6 have been described previously, they will not be described again here.

Referring again to FIG. 14, at step S182, central controller 80 and authentication controller 100 validate and authenticate the origin certificate 152 of the core component.

FIG. 15 shows the operations performed at step S182 to validate and authenticate the origin certificate 152.

Referring to FIG. 15, at step S220, central controller 80 and authentication controller 100 check whether origin certificate 152 is guaranteed by a guarantor. If it is not, then processing proceeds to step S232, at which it is determined that the origin certificate is not valid and authenticate and an error is returned, preventing the component from being loaded.

On the other hand, if it is determined at step S220 that there is a guarantor, then, at step S222, authentication controller 100 checks whether the guarantor's certificate is already stored in certificate store 102. If it is not, at step S224, central controller 80 and authentication controller 100 check whether the guarantor's certificate is provided within the JAR file 140 of the component itself, that is, in the guarantors certificates file 154. If it is determined at step S224 that the certificate is not present in the guarantors certificates file 154, then processing proceeds to step S232, at which it is determined that the origin certificate is not valid and authenticate and an error is returned, preventing the component from being loaded.

On the other hand, if it is determined at step S222 that the guarantor's certificate is already provided in certificate store S102, or if it is determined at step S224 that the guarantor's certificate is present in the JAR file 140 of the component, then at step S226 authentication controller 100 reads the public key 188 from the guarantor's certificate.

At step S228 central controller 80 and authentication controller 100 authenticate the guaranteed certificate (that is, the origin certificate 152 of the core component).

FIG. 16 shows the steps performed at step S228 to carry out the authentication.

Referring to FIG. 16, at step S260, central controller 80 and authentication controller 100 decrypt the digital signature 186 of the origin certificate 152 with the public key 188 read from the guarantor's certificate at step S226, thereby obtaining a message digest.

At step S262, central controller 80 and authentication controller 100 read the data 182 and 184 within the origin certificate and calculate a new message digest using the message digest algorithm previously used in the creation of the signature 186 on the origin certificate (defined in the extension to the signature). Authentication controller 100 obtains the message digest algorithm to perform this operation from the message digest algorithm store 104.

At step S264, central controller 80 and authentication controller 100 compare the message digest obtained at step S260 by decryption using the public key and the new message digest calculated at step S262.

At step S266, central controller 80 and authentication controller 100 determine whether the message digests compared at step S264 are the same. If it is determined that the digests are not the same, then, at step S268 it is determined that the data in the origin certificate is not authenticate. On the other hand, if it is determined at step S266 that the message digests are the same, then, at step S270, it is determined that the data in the origin certificate is authenticate.

Referring again to FIG. 15, at step S230, central controller 80 and authentication controller 100 determine whether the origin certificate tested at step S228 is authentic, by referring to the results of steps S266, S268 and S270.

If it is determined at step S230 that the certificate is not authentic, then, at step S232, an error is returned preventing loading of the component. On the other hand, if it is determined at step S230 that the certificate is authentic, at step S234, central controller 80 and authentication controller 100 determine whether the certificate was authenticated using the public key 188 from a certificate stored in certificate store 102. That is, central controller 80 and authentication controller 100 determine whether it was determined at step S222 that the guarantor's certificate was present in certificate store 102 such that the public key 188 therefrom was used in steps S226 and S228.

If it is determined at step S234 that the guarantor's certificate used for authentication was from the certificate store 102, then, at step S236, it is determined that the origin certificate 152 is valid and authentic. This is because it was authenticated using a guarantor's certificate stored in the application component control functions 62, which, by definition, belongs to a trusted authority since guarantor's certificates from non-trusted authorities are not stored in the application component control functions 62.

On the other hand, if it is determined at step S234, that the origin certificate 152 was authenticated at step S228 using the public key 188 from a guarantor's certificate stored in the JAR file 140 of the component (in the guarantors certificates file 154), then further tests are carried out to establish whether there is a chain of authentic certificates between the guarantor's certificate used at steps S226 and S228 to authenticate the origin certificate 152 and a certificate in certificate file 102. More particularly, at step S238, central controller 80 and authentication controller 100 determine whether the guarantor's certificate itself has a guarantor.

If it is determined at step S238 that the guarantor's certificate does not have a further guarantor, then, at step S240, it is determined that the origin certificate is not valid, and an error is returned, preventing the component from being loaded. On the other hand, if it is determined at step S238 that the guarantor's certificate has a further guarantor, then processing returns to step S222. The guarantor's certificate used previously to authenticate the origin certificate 152 then becomes the certificate to be validated and authenticated and the processing described above is repeated, reading the public key 188 from the certificate of the guarantor of the guarantor's certificate at step S226, and using this at step 5228 to authenticate the guarantor's certificate.

Steps S222 to S240 are performed to authenticate each guarantor's certificate in turn until a chain of authentic certificates has been established between the origin certificate 152 of the component and a certificate in certificate store 102, or until it is established that no such chain exists.

At step S242, central controller 80 and authentication controller 100 determine whether there is another certificate to be validated and authenticated. In the case of the origin certificate, only one certificate per component exists, and therefore it is determined that there are no further certificates to validate and authenticate. However, as will be described below, the steps shown in FIG. 15 are also used to validate the role certificates 150 of components. As shown in the example of FIG. 11b, a component may include more than one role certificate, in which case steps S220 to S242 shown in FIG. 15 are repeated until all of the role certificates have been validated and authenticated.

Referring again to FIG. 14, at step S184, central controller 80 and authentication controller 100 read the public key from the origin certificate 152 of the core component previously validated and authenticated at step S182.

At step S186, central controller 80 and authentication controller 100 authenticate the core component using the public key read at step S184. This is carried out by performing the processing operations shown in FIG. 16, and described above. More particularly, at step S260 (FIG. 16) central controller 80 and authentication controller 100 use the public key read from the origin certificate at step S184 to decrypt the digital origin signature 160 of the component. At step S262, central controller 80 and authentication controller 100 calculate a message digest of the manifest file 156 of the component which, as described above with respect to FIGS. 11a, 11b and 11c, is used to form the digital origin signature 160 of the component. These message digests are then compared in steps S264 to S270 as described above to determine whether the component is authentic.

Referring again to FIG. 14, at step S188 central controller 80 and authentication controller 100 validate and authenticate the role certificate(s) 150 of the core component. The processing operations performed at step S188 are the same as those described above with respect to FIG. 15, and accordingly will not be described again here.

At step S190, central controller 80 and authentication controller 100 read the public key 188 from the role certificate of the core component which corresponds to the role of the component itself (rather than certificates corresponding to roles to which the component will export Java classes), this role certificate having been validated and authenticated at step S188. As described above with respect to FIGS. 11a, 11b and 11c, the public key 188 read at step S190 is the public key corresponding to the private key used to create the digital role signature 158 of the component. That is, the public key 188 read at step S190 corresponds to the private key of the supplier of a different component which makes available a class for export to the core component.

At step S192, central controller 80 and authentication controller 100 authenticate the role of the core component. The processing operations performed at step S192 are shown in FIG. 16, which have been described above. More particularly, at step S260, central controller 80 and authentication controller 100 decrypt the digital role signature 158 (the digital role signature 158 having been created by a supplier of a component which exports a class to the core component by signing the manifest file 156 of the core component with a private key for the role to which the class is made available). The decryption is performed using the public key read from the role certificate at step S190. At step S262, central controller 80 and authentication controller 100 calculate a message digest for the manifest file 156 (since, as described above, the manifest file 156 is used in the creation of the digital role signature 158). These message digests are then used at steps S264 to S270 to determine whether the role of the core component is authentic.

Referring again to FIG. 14, the operations performed at steps S180 to S192 confirm whether the data in the component's JAR file has been supplied by the required supplier and has not been corrupted or changed. Accordingly, if the data passes all of these tests, at step S194, central controller 80 and classloader unit 110 create an object for the core component in the control namespace 72. The object created at step S194 contains the data from the component JAR file 140, which has been manifest checked, validated and authenticated at steps S180 to S192 (and is therefore referred to as "signed").

Referring again to FIG. 13, at step S126, component loader 88 updates address database 92 with details of the component for which the signed JAR file object was created at step S124. This update is carried out after step S124 to ensure that the component has been successfully validated and authenticated before information about the component is stored in address database 92.

FIG. 17 schematically illustrates information stored in address database 92.

Referring to FIG. 17, component loader 88 stores information defining the component, its release and version numbers, its universal resource locator (location), whether a local copy of the component is available within computer 2 (that is, whether a copy of the component will be retained in JAR file store 96 when the user has finished with the application), and, if a local copy is to be kept, the date that the component was fetched from the external computer.

As shown in FIG. 17, database 92 may contain more than one universal resource locator for a given component. This provides computer 2 with more capability to load components when network conditions prevent a connection being established with a given computer. When fetching and storing a component at step S122, central controller 80 and component loader 88 are arranged to try the first-named universal resource locator in database 92 and, if this fails, then to use the alternative universal resource locator(s) until the component is successfully downloaded. Each of the alternative universal resource locators is "pinged" (that is, central controller 80 connects computer 2 in turn to each external computer defined by an alternative universal resource locator and measures the connection time) and central controller 80 and component loader 88 are arranged to try the alternative universal resource locators in order of decreasing speed.

The storage of component JAR files in JAR file store 96 to provide a local copy provides improvements in performance of computer 2 when loading an application. This is because the component can be loaded very quickly from the JAR file store 96, and further allows computer 2 to run an application when no connection is available to communication path 10.

Referring again to FIG. 13, at step S128, under instruction from the central controller 80, primordial classloader 36 within the Java functional elements 34 creates a new component classloader for the core component and a default component sandbox object defining standard applet security access for the core component.

The new component classloader created at this step overrides the standard loadClass( ) method and getResourceAsStream( ) method in the Java functional elements 34, thereby allowing the new component classloader to implement its own policies for object loading, as described below. As noted above, the classloader defines a namespace, in which it creates objects from Java class files within its own signed JAR file (created at step S124) by converting byte code into executable code in Java virtual machine working memory 42. Each object created by the component classloader is tagged with a reference to that classloader, and the classloader maintains references to all of the objects it has created in a hashtable. An object created by a classloader cannot be changed by a user of computer 2. An example structure to provide the required functionality for a component classloader is given in Annex A.

At step S132, central controller 80 determines whether the component control class file 142 from the component's JAR file 140 is on the class path of the Java virtual machine.

If it is determined at step S132 that the component control class file 142 is on the class path, then, at step S135 an error is returned, preventing the component from being loaded, since it will not be possible for the application component control functions 62 to separate the component from other components. This is because each component will have access to components on the class path, and will therefore be able to access any component having a control class file 142 on the class path.

At step S134, central controller 80 determines whether the domain name in the component's origin certificate 152 (validated and authenticated at step S182) is the same as the prefix of the component name in the component's component control class file 142. If it is determined at this step that the domain name is not equal to the prefix of the component name, then, at step S135, an error is returned, preventing the component from being loaded. On the other hand, if it is determined at step S134 that the domain name is equal to the prefix of the component name, the processing proceeds to step S136. Step S134 is carried out to ensure that the component's name in the component control class file 142 is a reliable indicator of the component's originator. The test at step S134 stops a developer naming a component, for example, Microsoft.component, when the supplier is not in fact Microsoft.

At step S136, the new component classloader created at step S128 is used to create a control object for the core component from the component control class file 142 in the component's signed JAR file (created at step S124). This creates a new namespace for the component.

By performing steps S124 to S136 in the order shown in FIG. 13, it is ensured that no component is installed before it has been validated and authenticated and a default sandbox object defined for it. Accordingly, no operating instructions from an external supplier can be installed in computer 2 without these safeguards.

At step S138, references to the class objects created from the control JAR file 54 in the control namespace 72 are imported to the control object for the core component created at step S136 to provide the core component with access to the functionality of the application component control functions 62.

At step S140, central controller 80 and thread manager 84 create a new thread group for the core component, and create and run a thread within the thread group.

At step S142, central controller 80 identifies the classes within the core component which are available for export to other components. In the example of FIG. 11a, no such components are available, and therefore this is noted by central controller 80.

At step S143, if the component is imported to another component (see below) a reference to the new classloader is stored in the namespace 72 of the importing component. In the case of the core component, this is not an imported component, and therefore no reference is stored.

At step S144, central controller 80 determines whether the core component has any import requirements.

If it is determined at step S144 that the core component requires at least one further component in order to provide the application required by the user, the process returns to step S122.

Steps S122 to S144 are repeated until all components required for the application have been loaded as described above. That is, all of the import components specified in the core component and any further components specified by these import components and so on are loaded. Referring to the example shown in FIGS. 11a, 11b and 11c, by way of illustration, component B is loaded because it is specified in the import requirements of component A, and component C is loaded because it is specified in the import requirements of component B. (Of course, a component may specify the import of more than ne other component.)

When loading an imported component, steps S122, and S126 to S144 are performed in the manner described above, and will not be described again here.

FIG. 18 shows the steps performed at step S124 to create a signed JAR file object for a component other than the core component.

Referring to FIG. 18, steps S290 to S302 and S306 correspond to steps S180 to S194 in FIG. 14 described above, and accordingly will not be described again here. Step S304 in FIG. 18 comprises a check to determine whether the import requirements of the importing component are compatible with the export restrictions of the exporting component.

FIG. 19 shows the steps performed at step S304 to check the import/export compatibility.

Referring to FIG. 19, at step S330, central controller 80 and authentication controller 100 compare the import requirements defined in the component control class file 142 of the importing component, the role of the importing component (previously validated and authenticated, for example at step S192), with the export restrictions defined in the component control class file 142 of the exporting component.

At step S332, central controller 80 and authentication controller 100 determine whether the exporting component is making available for export the class required by the importing component (no check on export class role restrictions is made at this stage). Referring to the example shown in FIGS. 11a and 11b, component A requires class B1 to be imported, while component B makes available class B1 for export. Accordingly, in this case, central controller 80 and authentication controller 100 would determine that the class to be imported is available for export.

If it is determined at step S232 that the class to be imported is not available for export (that is, the class required to be imported is not listed in the export data of the exporting component), processing proceeds to step S344, at which central controller 80 and authentication controller 100 determine that export is not possible and an error is returned. On the other hand, if it is determined at step S232 that the class to be imported is available for export from the exporting component, then, at step S336, central controller 80 and authentication controller 100 determine whether the role of the importing component defined in the role signature 158 has the same name as the name of a role defined in component control class file 142 of the exporting component to which the exporting component will make available the class required to be imported (in the example of FIG. 11b, role X1 and X2).

If it is determined at step S336 that the class is not made available to a role having the same name as the role of the importing component, then, at step S344, central controller 80 and authentication controller 100 determine that export is not possible and an error is returned. On the other hand, if it is determined at step S336 that the class is made available for export to a role having the same name as the role of the importing component, then, at step S338, central controller 80 and authentication controller 100 read the public key from the role certificate 150 of the exporting component which has the same name as the role of the importing component (previously validated and authenticated at step S298 for example). At step S340 central controller 80 and authentication controller 100 compare the public key read at step S338 from the role certificate 150 of the exporting component with the public key from the role certificate 150 of the importing component (previously validated and authenticated at step S188).

At step S342, central controller 80 and authentication controller 100 determine whether the public keys compared at step S340 are the same. If it is determined that the keys are not the same, then at step S344, central controller 80 and authentication controller 100 determine that the roles are not the same (even though they have the same name), and return an error. On the other hand, if it is determined at step S342 that the public keys are the same, then at step S346, central controller 80 and authentication controller 100 determine that the roles are the same since they have the same name and the role certificate of the importing component and the role certificate of the exporting component (both previously validated and authenticated) define the same public key.

Steps S338 to S342 ensure that the security of component interaction is not compromised if two suppliers of components create roles which have the same name (that is, each supplier makes available one or more classes within his component for export to a component having a given role name which happens to be the same). By checking that the public key from the role certificate of the exporting component is the same as the public key from the role certificate of the importing component, it is ensured that the importing component is authorised by the supplier of the exporting component to receive the exported class from the exporting component.

Referring again to FIG. 13, when it is determined at step S144 that there are no further components to be imported, then processing proceeds to step S146.

The first time step S146 is carried out, processing operations are performed for the last component to be installed (that is, an imported component) with each of the other components being dealt with in subsequent iterations. At step S146, central controller 80 and system resources security manager 106 create a component sandbox object for the component in the component's namespace. In doing this, central controller 80 and system resources security manager 106 combine the security restrictions defined in the sandbox file 148 of the component and the maximum permitted security levels stored in access level store 108 (which stores platform security level file 56). More particularly, central controller 80 and system resources security manager 106 create a component sandbox object having the system resources access levels defined in the component's sandbox file 148 unless one of the access levels exceeds that defined in the access level store 108, in which case the level defined in the access level store 108 is defined for the component for that system resource. If a components JAR file 140 (and hence its signed JAR file object) does not contain a sandbox file 148, then, at step S146, central controller 80 and system resources security manager 106 create a component sandbox object for the component in the component's namespace which has the basic Java applet sandbox security access levels.

Also at step S146, central controller 80 replaces the default sandbox object previously created for the component at step S128 with the new sandbox object.

At step S148, central controller 80 checks whether the component is being loaded for the first time. If the component has been loaded previously, then processing proceeds to step S152. On the other hand, if the component has not been loaded before, then, at step S150, central controller 80 performs the installation instructions for the component defined in the component control class file 142.

At step S152, central controller 80 determines whether the component processed previously at step S146 is an imported component. If it is determined that the component is imported, then further components require sandbox objects to be created, and the processing returns to step S146.

Steps S146 to S152 are repeated until all of the components previously installed have been processed in the manner described above. When this is the case, at step S152, central controller 80 determines that the component previously processed is not an imported component, that is, it is the core component.

FIG. 20 schematically shows the result of performing the operations shown in FIG. 13 to install all of the components which, in this example, comprise components A, B and C.

Referring to FIG. 20, the primordial namespace 70 contains four further namespaces, namely control namespace 72 (previously created at step S12 when the control JAR file classloader was created), a component A namespace 220, a component B namespace 224, and a component C namespace 228. Each of the component namespaces 220, 224 and 228 was created when the component classloader was created at step S128.

Each component namespace 220, 224 and 228 contains references to the control class objects in the control namespace which, as described previously, provide the component with the functionality of the application component control functions 62. Each component namespace 220, 224 and 228 also contains the objects and associated class objects installed from the class files in the component's signed JAR file. In addition, component A namespace 220 includes references to the component B classloader since component B is an imported component to component A. Similarly, component B namespace 224 includes references to the classloader of component C since component C is an imported component to component B.

As a result of the processing operations described above, the components making up the application required by the user have been identified and installed in Java virtual machine 32.

In the processing described above, each component making up the application is fetched from an external computer 4, 6, 8 connected to the communication path 10, and a local copy is stored in JAR file store 96.

As described above, new releases and new versions of a component may be made available to computer 2 by storing the new release or new version on an external computer 4, 6, 8. The way in which this is done will now be described.

When a new version of a component becomes available (that is, the interface of the component is not changed in any way), the existing version stored on the external computer is overwritten with the new version. The old version therefore ceases to exist and the new version takes the same universal resource locator as the previous version. The new version will therefore be sent to computer 2 when the previous version is requested.

When there is a new release of a component (that is, the interface of the component has changed), the developer makes the new release available by storing it on an external computer 4, 6, 8 at a new universal resource locator. In addition, the developer overwrites the previous release of the component with a new version of that release. This new version has no functional changes, but its install method contains information that informs the receiving computer which downloads the component that a new release is available and provides information defining the universal resource locator of the new release. Thus, the component can register the location of the new release (or indeed other components) at the receiving computer.

This embodiment is configured to enable a user to control the processing operations performed at step S122 (FIG. 13) to control when a component is fetched from an external computer and when a local copy of the component stored in JAR file store 96 is used. This provides the user with control over when components are loaded from external computers to take account of upgrades etc and when the local copy of a component stored within computer 2 is used to decrease installation time for an application.

In this embodiment, a user may instruct the application component control functions 62 to load a component from an external computer when initially instructing computer 2 to load the application.

A user may also define that a component should be fetched from an external computer after a predetermined time has elapsed since the component was last fetched from an external computer. For example, a user may specify that a component is updated every month. These user instructions are stored by central controller 80 in the update instruction store 98.

In addition, a user may define whether a local copy of each component is to be retained in JAR file store 96 after the application made up from the components is shut down. These user instructions are also stored by central controller 80 in the update instruction store 98.

FIG. 21 shows the operations performed at step S122 to fetch and store components to form an application in accordance with this functionality.

Referring to FIG. 21, on receiving a request from a user to load an application, central controller 80 determines whether the user has requested in the input instructions that a component be fetched from an external computer.

If it is determined at step S380 that the user has not input any instructions specifying that the component should be fetched from an external computer, then, at step S382 central controller 80 reads the data stored in the update instruction store 98 to determine whether the user has set an update time for the component.

If it is determined at step S382 that no update time has been set by the user, then processing proceeds to step S386. On the other hand, if it is determined at step S382 that the user has set an update time, then at step S384, central controller 80 reads a clock (not shown) within the application component control functions 62 to determine the current date and the address database 92 to determine the data when the component was last fetched, and determines therefrom whether the predetermined time set by the user has elapsed since the component was last fetched.

If it is determined at step S384 that the predetermined time has not yet elapsed, or if central controller 80 determines that no date is provided within address database 92, then, at step S386 central controller 80 reads the address database 92 to determine whether a local copy of the component is stored in JAR file store 96. A local copy of the component may be stored in JAR file store 96 if the application requested by the user has been loaded before or, alternatively, if a different application which also uses the same component has been loaded onto computer 2.

If it is determined at step S386 that a local copy is available, then, at step S388, central controller 80 and component loader 88 fetch the local copy from JAR file store 96 for loading. The component is loaded, as described previously with respect to FIG. 13, FIG. 14 and FIG. 18.

On the other hand, if it is determined at step S386 that no local copy is available in JAR file store 96 or, if it is determined at step S380 that the user has requested the component to be fetched from an external computer, or, if it is determined at step S384 that the predetermined time set by the user has elapsed since the component was last fetched from an external computer, then, at step S390, central controller 80 and component loader 88 fetch the component from the external computer, as described above.

FIG. 22 shows the steps performed at step S126 (FIG. 13) to update the address database 92 to take account of new releases and new versions.

Referring to FIG. 22, at step S400, central controller 80 and component loader 88 determine whether the component was fetched from an external computer (rather than from internal JAR file store 96).

If it is determined at step S400 that the component has been loaded from JAR file store 96, then the processing ends. On the other hand, if it is determined at step S400 that the component was fetched from an external computer, then, at step S402, central controller 80 and component loader 88 compare the version number of the component defined in the component control class file 142 from the component JAR file 140 and the version number of the component defined in the address database 92 (if there is one), to determine whether the component fetched from the external computer is a new version.

If it is determined at step S402 that the version number stored in address database 92 is the same as the version number of the component defined in the component control class file 142, then processing proceeds to step S410. On the other hand, if it is determined at step S402 that the component is a new version (the version number defined in the component control class file 142 being higher than the version number stored in address database 92 or there being no record of the component in the address database), then, at step S404 central controller 80 and component loader 88 replace the entry for the component in the address database 92 with a new entry defining the new version number of the component.

At step S406, central controller 80 and component loader 88 read the component control class file 142 to determine whether the component has information stored therein indicating that a new release is available.

If it is determined at step S406 that there is no information indicating that a new release is available, the processing proceeds to step S410. On the other hand, if it is determined at step S406 that a new release of the component is available, then, at step S408 central controller 80 and component loader 88 and a further entry in the address database 92 for the new release of the component, storing the address for the new release given in the component control class file 142 read at step S406.

At step S410, central controller 80 reads the user instructions stored in update instruction store 98 to determine whether the component is to be stored locally in JAR file store 96 after the application is shut down. If it is determined that a local copy is to be stored, then, at step S412, central controller 80 stores the component in JAR file store 96 and updates the address database 92 to indicate that the local copy is available.

By controlling the component releases and versions as described above, and by updating the address database 92 as set out in FIG. 22, the embodiment is arranged so that, if a component simply requests the "latest" release of a component (rather than a specific release) in the import instructions defined in its component control class file 142, central controller 80 and component loader 88 will fetch and store the highest release of the component defined in address database 92. On the other hand, if the import instructions of a component specifically request an earlier release of a component, central controller 80 and component loader 88 will fetch and store the specified earlier release since this release has an entry in address database 92 and is still made available by the supplier on an external computer 4, 6, 8. This enables components that rely on specific releases of other components to continue to work after a new release.

Running the Application

When an application created as described above is run, an object for each Java class defined in the file 144 of each component and an object for each resource class defined in the file 146 for each component is created as and when the class is required for the application.

FIG. 23 shows the operations performed to create an object for a Java class file or resource class file.

Referring to FIG. 23, at step S338, central controller 80 determines the component making the request for the class file. This is done by reference to the thread of the component.

At step S440, central controller 0.80 determines whether the class object for the class requested already exists in the requester's namespace. If the namespace of the requester already has the required class object, then, at step S442, a new object is returned.

On the other hand, if it is determined at step S440 that the required class object does not already exist in the requester's namespace, then, at step S444, central controller 80 determines whether the required class object already exists in the primordial namespace. If the required class object does already exist in the primordial namespace, then, at step S446, a new object is returned.

On the other hand, if it is determined at step S444 that the primordial namespace does not contain the required class object, then at step S448, central controller 80 determines whether the class can be loaded with the primordial class loader, by determining whether the class file is on the Java working machine class path. If it is determined at step S448 that the class is on the class path, then, at step S450, the object is loaded using the primordial classloader.

On the other hand, if it is determined at step S448 that the class cannot be loaded with the primordial classloader, then, at step S452, central controller 80 determines whether the class can be loaded with the classloader of an imported component by referring to the import and export restrictions of the components determined previously (as described above). Referring to FIG. 11a and 11b by way of example, when one of the Java classes A1–An in component A requests the Java class B1 of component B, at step S452, central controller 80 determines that this import is allowable since the import of class B1 from component B to component A is permitted.

If it is determined at step S452 that the class can be loaded with the classloader of the imported component, then, at step S454, central controller 80 instructs the classloader of the imported object to create an object, and a reference to the class object of the new object is stored in the namespace of the component which requested the class file (that is, the importing component). The reference is stored in the class object memory (hashtable) of the classloader of the importing component.

On the other hand, if it is determined at step S452 that the class cannot be loaded with the classloader of the imported component, then, at step S456, central controller 80 determines whether the requested class is in the signed JAR file of the requesting component. If it is determined that the class is within the signed JAR file of the requesting component, then, at step S458, an object is created with the classloader of the requesting component.

On the other hand, if it is determined at step S456 that the class file is not in the signed JAR file of the requesting component, then at step S460, central controller 80 determines that the class cannot be loaded and returns an error.

Controlling Inter-Component Interaction

When a class object calls another class object, the Java virtual machine 32 passes the call to the classloader of the object making the call (this being identified in the class object itself). If the classloader does not have the required class object, and cannot load the class object (see description of FIG. 23 above) then the call fails. Thus, a component must have a class object in order to call the methods of that class object. A component cannot access the class objects of another component as each component has separate classloaders (created at step S128 in FIG. 13).

The only way in which a classloader (component) can access an object for which it does not have the associated class object or Java class file is via the classloader (component) which can create that object. That is, the only way that the classloader can access an object which it does not have in its namespace is by another classloader passing a reference to the required class object to the requesting classloader. However, as described above, the passing of classes in this manner is controlled by import and export rules.

An imported class may use any class from its "parent" component (that is, the component from which it is exported), whether they are exported or not. Therefore, a single class can be exported without having to export all of the classes upon which it depends. However, a component that has been authorised to use a class from another component cannot directly reference any class upon which the imported class depends.

An imported class cannot access the class objects in the importing component because the imported class remains in its own namespace, and only a reference is stored in the namespace of the importing component. As described above, components are isolated from each other and the functionality within a component cannot be accessed by other components unless the component makes the functionality available by exporting the appropriate Java class. This allows the supplier of a component to provide different functions in different Java classes in a component thereby enabling the component to be used in a number of different processing applications in which the functionality provided by the component for each application is different, and to retain control over access to the functions by defining which functions are available for export and the role required by a component to import the function.

Controlling Access to System Resources

Each time an object requires access to a resource of computer 2, a request is made to the system resources security manager 106, which, as noted above, replaces the conventional Java security manager provided with the Java virtual machine 32.

FIG. 24 shows the operations performed by the system resources security manager 106 to determine whether the component should be allowed to access the requested system resource.

Referring to FIG. 24, at step S500, central controller 80 and system resources security manager 106 determine the classloader of the object making the request for access to a system resource.

FIG. 25 shows the operations performed at step S500 to determine the classloader of the object making the request.

Referring to FIG. 25, central controller 80 and system resources security manager 106 read the call stack defining the chain of calls made between objects leading to an object requesting access to the system resource to determine the class object which originated the request.

More particularly, at step S530, central controller 80 and system resources security manager 106 read the call stack to determine the next class object in the stack, this being the most recently called class object (that is, the class object which actually made the request for access to the system resource) the first time step S530 is performed.

At step S532, central controller 80 and system resources security manager 106 determine the classloader of the class object read at step S530. This functionality is available from the standard Java development kit Java.lang.class object within the Java functional elements 34.

At step S534, central controller 80 and system resources security manager 106 determine whether the classloader identified at step S532 is a component class loader (that is, a classloader created to load a component). (It should be noted that, the first time step S534 is performed, it will be determined that the classsloader identified at step S532 is not a component classloader, and is instead the primordial classloader, because all requests for a system resource are made through the JDK classes 38 of the Java functional elements 34, which were loaded by the primordial classloader.)

If it is determined at step S534 that the classloader is a component classloader, then, at step S536, central controller 80 and system resources security manager 106 determine that the classloader of the object making the request for access to the system resource is the component classloader identified at step S532.

On the other hand, if it is determined at step S534 that the classloader is not a component classloader, then, at step S538, central controller 80 and system resources security manager 106 determine wether there is another class object in the call stack. If it is determined at step S538 that there is no further class object in the call stack, then, at step S540, central controller 80 and system resources security manager 106 determine that the classloader of the object making the request for access to the system resource is the primordial classloader. On the other hand, if it is determined at step S538 that there is a further class object in the call stack, the processing returns to step S530 and the operations described above are repeated until it is determined at step S534 that the classloader is a component classloader or until it is determined at step S538 that there is no further class object on the call stack.

By performing the operations described above with respect to FIG. 25 to determine the classloader of the object making the request, the application component control functions 62 determine the first component (if there is one) above the JDK classes to make the access request.

Referring again to FIG. 24, at step S502, central controller 80 and system resources security manager 106 determine whether the classloader identified at step S500 is the primordial classloader. If it is determined that the classloader is the primordial classloader, then, at step S508, central controller 80 and system resources security manager 106 permit access to the requested system resource. Access to the system resource is permitted to an object created by the primordial classloader since the object's JAR file is on the class path, and is therefore trusted since it cannot be changed by a component from an external supplier. On the other hand, if it is determined at step S502 that the classloader of the object making the request is not the primordial classloader, then, at step S504, central controller 80 and system resources security manager 106 call the component sandbox object to read the component sandbox file for the determined classloader.

At step S506, central controller 80 and system resources security manager 106 compare the requested access with the access levels defined in the component sandbox file read at step S504 to determine whether the request is allowable.

If it is determined at step S506 that the request is allowable, access to the requested system resource is permitted at step S508. On the other hand, if it is determined at step S506 that the access requested is prevented by the component sandbox file, then, at step S510, central controller and system resources security manager 106 deny access to the requested system resource.

Further Control by Application Component Control Functions 62

Central controller 80 and system resources security manager 106 perform control to ensure that only the application component control functions 62 can create classloaders, thereby preventing components from creating classloaders. More particularly, each request to create a classloader is passed to the system resources security manager 106, which is arranged to refuse the request unless it is a request from an application component control function 62.

Central controller 80 and thread manager 84 control threads to ensure that a component can modify threads only if they are in the component's thread group, thereby preventing a component from modifying threads of another component or the threads of the application component control functions 62. In addition, central controller 80 and thread manager 84 control threads so that the priority of a component's thread can be set only up to a maximum level, which is below the priority level of the threads for the application component control functions 62. This prevents a component taking priority to the application component control functions 62.

Central controller 80 also performs control to ensure that the application component control functions 0.62 can only be shut down as the results of an internal instruction, thereby preventing a component from shutting down the application component control functions 62.

Example Applications

Having described the operation of this embodiment for a processing application in general, a description will now be given of particular applications for illustration purposes.

The first processing application which will be described comprises an application for facilitating and controlling the on-line purchase of goods, although, of course, other applications are possible.

This example processing application comprises three components, which will be referred to as component A, component B and component C.

Component A is the core component which is provided by a vendor of goods. Component A provides functionality to enable the user of the computer onto which it is loaded and run to order goods from the vendor (for example to transmit data to the vendor in the required format to enable the required goods to be identified and shipped to the user). Component A is provided on a server run by the vendor. Component A imports class B1 and class B2 from component B, and class C1 from component C.

Component B is provided by a bank at which the user and the vendor have an account. Component B contains a number of classes which provide functionality for performing different respective bank account management operations. Class B1 in component B provides processing functions for debiting an account at the bank. Class B2 in component B provides processing functions for crediting an account at the bank. Component B makes available class B1 for export to components having a role X1 defined by the bank and makes available class B2 for export to components having a role X2 defined by the bank. Component A, which requires class B1 and class B2, is checked by the bank (to ensure that it performs processing operations which are acceptable to the bank, and no other operations) and the manifest file of component A is signed by the bank using a first private key to provide component A with the required role signature for role X1 and using a second private key to provide component A with the required role signature for role X2. Component B is stored on a server provided by the bank. The universal resource locator of component B is defined in component A.

Component A also imports class C1 from component C. Component C is provided by a company which supplies goods to the vendor. Class C1 provides functionality to enable the user to search and query a database containing the specifications of the goods from the supplier which are sold by the vendor. Component C makes available class C1 for export to components having a role Y1 defined by the supplier. Component A, which requires class C1, is checked by the supplier to ensure that only processing operations acceptable to the supplier are performed by component A, and the manifest file of component A is signed by the supplier using a private key to provide component A with the required role signature for role Y1. Component C is stored on a server provided by the supplier, and is updated each time the specification of the goods changes. The universal resource locator of component C is defined in component A.

When loaded onto the user's machine as described above, the components are isolated from each other and from the resources of the user's machine. For example, functionality in component B which relates to the management of bank accounts other than that exported by the component (that is, the functions provided in class B1 and class B2) cannot be used by component A.

A second processing application will now be described. This second application comprises two components, namely component D and component B. Component B is the same component B as in the first processing application described above, namely the component from the bank which provides functionality for performing different respective bank account management operations.

Component D is the core component, and comprises a component for performing personal finance management operations (such as the calculation of income and outgoings etc). Component D is provided by a software supplier, and may itself be made up of a number of separate components. Component D is provided on a server run by the software company. Component D imports class B3 from component B.

Class B3 in component B provides processing functions for obtaining account details (such as the current amount in an account, the automatic monthly payments which are made from the account, etc) from the bank's database. Component B makes available class B3 for export to components having a role X3. Component D is checked by the bank to ensure that all of the processing operations which it can perform are acceptable to the bank, and is signed by the bank using a private key to provide component D with the required role signature for role X3.

When component D is loaded onto the user's machine as described above, processing operations are performed which determine that component B is required. If the first processing application has been loaded onto the user's machine, then component B is already available on the user's machine. Accordingly, component B is not re-fetched from the bank's server (although, of course, it would be if component B was not available in the user's machine).

As in the first processing application example, functionality in component B is isolated from component D, except for the functionality in the class which is exported to component D (that is, class B3). Component D cannot therefore access the account debiting and crediting functionality provided in class B1 and B2 of component B.

Accordingly, the bank is able to provide a single component for use in a number of different processing applications, and the functionality provided by component B for each application can be different because functionality other than that exported remains secure.

Modifications

A number of modifications are possible to the embodiment described above.

In the embodiment above, it is assumed that computer 2 has authority (for example by the user making appropriate payments) to download information from an external computer 4, 6, 8. The embodiment may be arranged such that, in response to a request from a user for an application, computer 2 connects to the external computer storing the core component, and downloads information defining the price of the core component, and information defining additional components required by the core component. Computer 2 may then connect to external computers storing the required further components to download similar information therefrom. Upon completion, computer 2 may present pricing information to the user.

In the embodiment above, the application component control functions 62 may be arranged to display to the user a list of applications which are available to the user based on the applications for which a core component is defined in application database 112 or address database 92.

In the embodiment above, the core component (that is, component A shown in FIG. 11a) has import requirements, but does not export any classes. However, the core component may export one or more classes as well as importing one or more classes.

In the embodiment above, each component making up an application belongs to one role. However, a component may belong to no role, or may belong to more than one role.

In the embodiment above, guarantors certificates 154 are provided as part of each component making up an application. However, it is possible to omit these certificates from the components, and instead rely upon the necessary guarantors certificates being present in certificate store 102 within computer 2.

In the embodiment above, the component control class file 142 in the component JAR file 140 defines the universal resource locator for each component to be imported. Instead, the import information in component control class file 142 may state just the name of the component to be imported and the particular class(es) therein, and a database of component names and universal resource locators may be provided within application component control functions 62, to enable central controller 80 to determine the universal resource locator for a given component to be imported.

In the embodiment above, the platform security level file 56 and the sandbox file 148 of a component each define access levels in a binary form. That is, the access level defined for each system resource merely defines whether access is, or is not, permitted. However, different forms of access level may be defined. For example, the access levels for file read and file write may define that access is permitted, but only in specified directories.

In the embodiment above, message digest algorithms are input in a file 62. However, the message digest algorithms may instead be input as part of the boot JAR file 52.

The embodiment above may be arranged to allow a user to add new certificates to one or more certificate stores 102. In this case, central controller 80 and authentication controller 100 would allow a new certificate to be stored in a certificate store 102 only if the new certificate had a guarantor whose certificate was already stored in the certificate store 102, or if the new certificate was from a root certification authority.

In the embodiment above, additional functional components may be provided within the application component control functions 62 to enable a user to store private keys and certificates and to encrypt data, thereby enabling the user to create a component for an application.

In the embodiment above, the data within certificate store 102 is encrypted. This provides security if private keys are stored therein. However, the data within certificate store 102 need not be encrypted.

In the embodiment above, additional functional units may be added to the application component control functions 62 to enable a user to define and record configuration settings, that is settings defining which components of an application should be loaded automatically at start up of computer 2. This functionality may be provided through the use of a configuration file having the same format as the Microsoft INI file.

In the embodiment above, computer 2 is configured to fetch components making up an application from external computers. However, the security features of computer 2 described above to control the interaction of components with each other and with the system resources can equally be applied to components making up an application received on storage media, such as a disk. Accordingly, in this modification, the application component control functions 62 may be provided without the network interface 94. Central controller 80 and component loader 88 may be arranged to determine whether a required component is stored in the JAR file store 96 and, if it is not, to output a message to the user via user interface unit 86 requesting that the component be loaded by the user, for example on a storage medium via disk drive 18. The embodiment described above in which components are fetched from external computers via a network provides the advantage that the latest releases/versions of a component can be loaded when the application is to be run. However, the modification in which components are loaded on storage media still provides the advantages that a given component can be used in a number of different applications, the amount of data that it is necessary to transfer to a user on a storage medium is reduced (since the whole application does not need to be stored), increased functionality can be achieved by using components from different suppliers to make an application, and suppliers can provide improved components more quickly since only the component needs to be changed and not the whole application.

In the embodiment above, computer 2 is configured with a Java virtual machine and application component control functions 62 to control the interaction of components with each other and with the computer systems resources. However, if these security features are not required, a computer without the Java virtual machine and the full application component control functions 62 described above may be used to identify and gather the components necessary for an application required by the user and to run the application using the components. For example, functional units of a central controller 80, working memory 82, interface unit 86, component loader 88, address database 92, network interface 94, file store 96, update instruction store 98 and application database 112 may be provided within a computer without the Java virtual machine to enable components making up an application to be fetched from external computers and loaded into the user's computer. An authentication controller 100, a certificate store 102 and a message digest algorithm store 104 may also be provided to validate and authenticate components fetched from external computers. The operation of this modification would be the same as the embodiment described above, but without the control of the inter-component interaction and without the control of the interaction between components and the system resources.

In the embodiment above, computer 2 is configured with a Java virtual machine 0.32 and application component control functions 62 are provided within this. However, languages other than Java may be used on computer 2. The features which a replacement language should provide are:
  The ability to provide a security manager, through which all calls to systems resources are routed, and which can control the access requested.
  The ability to isolate components from each other, and to allow inter-component interaction only in accordance with predefined rules.

Annex A

Example Sandbox File
An example format for a sandbox file 148 is:

| | |
|---|---|
| permission.file.read = | * |
| permission.file.write = | * |
| permission.file.delete = | * |
| permission.socket.connect = | *.* |
| permission.socket.accept = | *.* |
| permission.socket.listen = | * |
| permission.net.multicast = | * |
| permission.properties.access = | * |
| permission.printjob.access = | * |

-continued

```
permission.systemclipboard.access =          *
permission.awteventqueue.access =            *
permission.system.exec =                     *
permission.system.link =                     *
permission.security.access =                 *
permission.net.setfactory =                  *
permission.reflection.memberaccess =         *
permission.system.toplevelwindow =           *
```

Each line defines the level of access that a component has to the named system resource. A "*" indicates that full access is allowed and "none" or the absence of an entry indicates that the component has no access to the resource.

The effect of the access levels on each named system resource is as follows:

"permission.file.read": Valid values for this permission are * to allow read access to any file and none to disallow read access to any file.

"permission.file.write": Valid values for this permission are to allow read acces to any file and none to disallow read access to any file.

"permission.file.delete": Valid values for this permission are * to allow deletion of any file and none to disallow deletion of any file.

"permission.socket.connect": Valid values for this permission are *:* to allow socket connections (network connections) to be initiated to any host and none to disallow socket connections to any host.

"permission.socket.accept": Valid values for this permission are to allow socket connections to be acceted from any host and none to disallow socket connections being accepted from any host.

"permission.socket.listen": Valid values for this permission are * to allow socket connections to be listened to and none to disallow socket connections to be listened to.

"permission.net.multicast": Valid values for this permission are * to allow multicast sockets (network broadcast connections) and none to disallow multicast sockets.

"permission.properties.access": Valid values for this permission are * to allow property access (access to Java configuration values) and none to disallow property access.

"permission.printjob.access": Valid values for this permission are * to allow print job access and none to disallow print job access.

"permission.systemclipboard.access": Valid values for this permission are * to allow clipboard access and none to disallow clipboard access.

"permission.awteventqueue.access": Valid values for this permission are * to allow event queue access (windows events) and none to disallow event queue access.

"permission.system.exec": Valid values for this permission are * to allow execution of operating system programs in a command shell and none to disallow execution.

"permission.system.link": Valid values for this permission are * to allow native libraries to be loaded so as to link code other than Java to make the code available for calling and none to disallow native libraries being loaded.

"permission.security.access": Valid values for this permission are * to allow access to Java security classes and none to disallow access to security classes.

"permission.net.setfactory": Valid values for this permission are * to allow network related factories (which define the behaviour of networking libraries in Java) to be replaced and none to disallow network related factories from being replaced.

"permission.reflection.memberaccess": Valid values for this permission are * to allow access to Java reflection libraries objects and none to disallow reflection.

"permission.system.toplevelwindow": Valid values for this permission are * to allow top level windows to be created without "applet window" warning message and none to allow top level windows to be created with "applet window" warning.

Example of Functionality Defined by Methods in a Component Classloader

An example of the functionality defined by methods in a component classloader is:

public class ComponentClassLoader extends ClassLoader

```
public class ComponentClassLoader extends ClassLoader
{
    protected Hashtable cache;          // class objects already
                                        // defined, keyed on class
                                        // name
    protected Hashtable imported;       // class loaders able to
                                        // supply authorised
                                        // imported classes - keyed
                                        // on class name
    protected JARfile jarfile = null;   // signed JAR file
                                        // containing class
                                        // files
    protected ComponentId componentId;
    protected Sandbox sbx = null;       // Sandbox to be applied to
                                        // classes from this
                                        // component
    public ComponentClassLoader(JARFile jarFile)
    {
        this.jarFile   = jarFile;
        cache          = new Hashtable(300);
        imported       = new Hashtable(100);
        this.sbx       = new Sandbox( false );    // default to
                                                  // APPLET
                                                  // sandbox -
                                                  // no access
        componentId    = null;
    }
    public void setComponent( ComponentId componentId )
    {
        this.componentId = componentId;
    }
    public Sandbox getSandbox( )
    {
        return this.sbx;
    }
    public void setSandbox( Sandbox sandbox)
    {
        this.sbx = sandbox;
    }
    public JARFile getJAR( )
    {
        return jarFile;
    }
    public Class loadClass( String name) throws
        ClassNotFoundException
    {
        return loadClass(name,true);
    }
    public void importClass( String className, ClassLoader cl)
    {
        Use the security manager to check that the caller of
            this method is the SCP, this stops any other
            component getting the class loader for a class
            and importing classes into their namespace.
        Add the classloader associated with the imported
            class name to the list of imported classes.
    }
    public InputStream getResourceAsStream(String name)
    {
```

-continued

```
        Call the SignedJARFile object to get an input stream
            on the named resource.
    }
    protected synchronized Class loadClass( String className,
        boolean resolve ) throws ClassNotFoundException
    {
        Check the cache of already defined classes -
            return the cached object if it exists
        Check for the class on the CLASSPATH by calling
            the standard java native method:
            newClass = findSystemClass(className)
            return class if it exists.
        Call checkSpecialClass(className) to ensure that the
            class we are about to define does not belong to
            a banned package.
        Check the list of imported classes to see if the
            class has been imported from another component.
            Get the component class loader associated with
                the imported class to load the class on our
                behalf.
            Call checkPackageAccess( ) to ensure we have
                access to the package to which the imported
                class belongs.
            Remove the class from the imported list
            Add class to the cache of returned classes
            return imported class object
        Call checkPackageDefinition( ) to ensure we are
            allowed to define classes from the package.
        Call cartridgeClass( className ) to define the class
            from classbytes in our JAR file.
        If the classloader has requested class resolution
            then call the standard java method:
            resolveClass(newClass)
        If the class not defined by any of the above, then
            throw a ClassNotFoundException
    }
    private void checkPackageAccess(String className) throws
        IllegalAccessException
    {
        check with the security manager that this class can
            be accessed SecurityManager.checkPackageAccess
            (className);
    }
    private void checkPackageDefinition(String className)
        throws IllegalAccessException
    {
            check with the security manager that this class
                can be defined
                SecurityManager.checkPackageDefinition
                (className);
    }
    private void checkSpecialClass( String className ) throws
        IllegalAccessException
    {
        don't allow classes which belong in the "java" or
            "sun" packages to be defined
    }
    private synchronized Class cartridgeClass ( String
        className)
    {
        Get byte array of class bytes from the SignedJARFile
        Call standard java native method to create a class
            object: newClass = defineClass( class name,
            class bytes )
        Add the new class to the cache of created classes
        return the new class
        Return null if for any reason a class cannot be
            created
    }
}
```

The invention claimed is:

1. A system of connected computer apparatus, comprising a programmable user processing apparatus for use by a user and at least one storage apparatus, the storage apparatus storing data defining separate components of at least one processing application, wherein the user processing apparatus is configured to fetch data defining components of at least one processing application to be used by the user from the storage apparatus, wherein the user processing apparatus is configured to install the components so that the components are isolated from each other by placing the components in separate namespaces, wherein access to each of the separate namespaces is controlled by a loader, wherein the user processing apparatus is configured to permit operational interaction between the components in accordance with defined interaction rules for importing and exporting component functionality between the separate namespaces to enable the application to be used by the user, wherein the user processing apparatus is configured to re-fetch data defining one or more of the components in accordance with defined rules and to use the re-fetched data for the application, and wherein the user processing apparatus is configured to arrange and test the components to verify their authenticity and/or to verify the defined interaction rules.

2. A system according to claim 1, wherein the user processing apparatus is configured to re-fetch data defining one or more of the components in accordance with user instructions and to use the re-fetched data for the application.

3. A system according to claim 1, wherein the user processing apparatus is operable to store data defining at least one of the received components after the application is shut down, and to use the stored data when the application is reused by the user.

4. A system according to claim 3, wherein the user processing apparatus is operable to store and reuse the data in accordance with defined rules.

5. A system according to claim 1, wherein the data defining each component defines any further components which are needed by the component, and wherein the user processing apparatus is configured to receive user instructions defining an application, to determine a first component needed for the application, to fetch the first component and identify any further components required, to fetch any further components required, and to continue identifying and fetching components until all of the components for the required application have been obtained.

6. A system according to claim 5, wherein the user processing apparatus is operable to determine the first component from user instructions.

7. A system according to claim 5, wherein the user processing apparatus is operable to determine the first component from a database of components.

8. A system according to claim 1, wherein the data defining the components includes interaction rules.

9. A system according to claim 8, wherein the rules defined in the data defining components include rules defining functions within a component which will be made available to other components of a specified type.

10. A system according to claim 1, wherein the user processing apparatus is configured to install the components so that the components are isolated from resources of the user processing apparatus, and to permit access by the components to the isolated resources in accordance with defined rules.

11. A system according to claim 10, wherein the user processing apparatus is configured to route each request from a component for access to a resource to a security manager, the security manager being operable to determine whether to permit the access in accordance with pre-stored rules.

12. A system according to claim 1, wherein the user processing apparatus is provided with a virtual machine and is arranged to load each component into the virtual machine.

13. A system according to claim 12, wherein the user processing apparatus is configured to load each component into the virtual machine using a different classloader.

14. A system according to claim 1, wherein the user processing apparatus is configured to provide threads to run each received component, and is further configured to manage the threads such that a component can not change a thread other than one under which it is running.

15. A system according to claim 1, wherein the user processing apparatus is configured to provide threads to run each received component, and is further configured to manage the threads to prevent a component setting the priority of a thread above a predetermined level.

16. A system according to claim 15, wherein the user processing apparatus is configured to set the predetermined level in dependence upon the priority of the threads for running its control functions to ensure that a component cannot override a control function.

17. A system according to claim 1, wherein the user processing apparatus is configured to test received data defining a component to determine whether the component is from a given supplier.

18. A system according to claim 1, wherein the user processing apparatus is configured to test received data defining a component to determine whether the data defining the component has been changed since it was provided by the supplier.

19. A system according to claim 1, wherein the user processing apparatus is operable to use a given component in a plurality of applications.

20. A programmable processing apparatus for use in a system according to claim 1, comprising:
   means for downloading data defining a plurality of separate components of a processing application from one or more external apparatus when the programmable processing apparatus is connected to the external apparatus; and
   means for installing the received components to enable the application to be used by a user.

21. A storage apparatus for use in a system according to claim 1, comprising:
   memory means storing data defining at least one component of a processing application to be transmitted to a programmable user processing apparatus.

22. A system of connected computer apparatus, comprising a programmable user processing apparatus for use by a user and at least one storage apparatus, the storage apparatus storing data defining separate components of at least one processing application, wherein the user processing apparatus is configured to fetch data defining components of a processing application to be used by the user from the storage apparatus, wherein the user processing apparatus is configured to install the components so that the components are isolated from each other by placing the components in separate namespaces wherein access to each of the separate namespaces is controlled by a loader, wherein the user processing apparatus is configured to permit operational interaction between the components in accordance with defined interaction rules for importing and exporting component functionality between the separate namespaces to enable the application to be used by the user, wherein the user processing apparatus is configured to re-fetch data defining one or more of the components in accordance with defined rules and to use the re-fetched data for the application, and wherein the user processing apparatus is configured to arrange and test the components to verify their authenticity and/or to verify the defined interaction rules, the user processing apparatus comprising a downloader configured to download data defining a plurality of separate components of a processing application from one or more external apparatus when the programmable processing apparatus is connected to the external apparatus, and the user processing apparatus comprising an installer configured to install the received components to enable the application to be used by a user.

23. A storage apparatus for use in a system according to claim 22, comprising a memory storing data defining at least one component of a processing application to be transmitted to a programmable user processing apparatus.

24. A programmable processing apparatus, comprising:
   a receiver configured to receive data defining a plurality of separate components to make up a processing application; and
   a loader configured to install the received components to enable the application to be run, wherein the loader is configured to install the components such that the components are isolated from each other by placing the components in separate namespaces, wherein access to each of the separate namespaces is controlled by the loader, and wherein the loader is configured se as to permit operational interaction between the components in accordance with defined rules for importing and exporting component functionality between the separate namespaces; and
   a verifier configured to arrange and test the components to verify their authenticity and/or to verify the defined interaction rules.

25. Apparatus according to claim 24, wherein the loader is configured to permit operational interaction between the components in accordance with rules defined in received data defining the components.

26. Apparatus according to claim 25, wherein the rules defined in the data defining components include rules defining functions within a component which will be made available to other components of a specified type.

27. Apparatus according to claim 24, wherein the loader is configured to install the data so that the components are isolated from resources of the apparatus, and to permit access by the components to the isolated resources in accordance with defined rules.

28. Apparatus according to claim 27, wherein the loader is configured to route each request from a component for access to a resource to a security manager, the security manager being operable to determine whether to permit the access in accordance with pre-stored rules.

29. Apparatus according to claim 24, wherein the loader is arranged to install each component into a virtual machine.

30. Apparatus according to claim 29, wherein the loader is operable to install each component using a different classloader.

31. Apparatus according to claim 24, wherein the receiver is operable to receive data defining a component from a storage medium.

32. Apparatus according to claim 24, wherein the receiver is operable to receive data defining a component transmitted as a signal from an external apparatus.

33. Apparatus according to claim 24, wherein the loader is operable to use a given component in a plurality of applications.

34. A method of operating a programmable processing apparatus, comprising:

receiving data defining a plurality of separate components to make up a processing application;

installing the received components to enable the application to be run, wherein the components are isolated from each other by placing the components in separate namespaces, wherein access to each of the separate namespaces is controlled by a loader, and wherein operational interaction between the components is permitted in accordance with defined rules for importing and exporting component functionality between the separate namespaces; and arranging and testing the components to verify their authenticity and/or to verify the defined interaction rules.

35. A storage device storing instructions for causing a programmable processing apparatus to become configured as an apparatus as claimed in claim 24.

36. A programmable processing apparatus, comprising:

receiving means for receiving data defining a plurality of separate components to make up a processing application; and loading means for installing the received components to enable the application to be run, wherein the loading means is configured to install the components such that the components are isolated from each other by placing the components in separate namespaces, wherein access to each of the separate namespaces is controlled by the loading means, and wherein the loading means is configured to install the components so as to permit operational interaction between the components in accordance with defined rules for importing and exporting component functionality between the separate namespaces; and verifying means for arranging and testing the components to verify their authenticity and/or to verify the defined interaction rules.

* * * * *